(12) United States Patent
Kobayashi et al.

(10) Patent No.: US 12,010,936 B2
(45) Date of Patent: Jun. 18, 2024

(54) WORK VEHICLE

(71) Applicant: KUBOTA CORPORATION, Osaka (JP)

(72) Inventors: Kumiko Kobayashi, Sakai (JP); Kenzo Ushiro, Sakai (JP); Sadao Yamanaka, Sakai (JP)

(73) Assignee: KUBOTA CORPORATION, Kyoto (JP)

( * ) Notice: Subject to any disclaimer, the term of this patent is extended or adjusted under 35 U.S.C. 154(b) by 113 days.

(21) Appl. No.: 17/825,072

(22) Filed: May 26, 2022

(65) Prior Publication Data

US 2022/0377965 A1 Dec. 1, 2022

(30) Foreign Application Priority Data

Jun. 1, 2021 (JP) ................................. 2021-092543
Jun. 1, 2021 (JP) ................................. 2021-092544

(51) Int. Cl.
*A01B 71/00* (2006.01)
*A01B 59/06* (2006.01)
*B60K 25/06* (2006.01)
*B62D 49/06* (2006.01)

(52) U.S. Cl.
CPC ............ *A01B 71/00* (2013.01); *A01B 59/067* (2013.01); *B60K 25/06* (2013.01); *B62D 49/06* (2013.01)

(58) Field of Classification Search
CPC ........ A01B 71/00; A01B 59/067; B60K 25/06
See application file for complete search history.

(56) References Cited

U.S. PATENT DOCUMENTS

| 2,957,529 | A | 10/1960 | Kaller | |
|---|---|---|---|---|
| 3,633,679 | A | 1/1972 | Dahlberg et al. | |
| 10,404,137 | B2 * | 9/2019 | Bering | A01B 59/062 |
| 11,679,674 | B1 * | 6/2023 | Chapman | B60K 25/02 |
| | | | | 180/53.5 |
| 2020/0323127 | A1 * | 10/2020 | Takaki | A01C 7/08 |

FOREIGN PATENT DOCUMENTS

| JP | 60-251804 A | 12/1985 |
|---|---|---|
| JP | 01-146805 U | 10/1989 |
| JP | 07-22604 U | 4/1995 |
| JP | 08-131047 A | 5/1996 |
| JP | 2002-209404 A | 7/2002 |

(Continued)

OTHER PUBLICATIONS

Official Communication issued in corresponding European Patent Application No. 22174504.5, mailed on Nov. 17, 2022.

(Continued)

*Primary Examiner* — Faye M Fleming
(74) *Attorney, Agent, or Firm* — Keating & Bennett, LLP

(57) ABSTRACT

A tractor includes a link mechanism and a power extractor. The link mechanism includes a top link, a right lower link, and a left lower link. A work apparatus is connectable to the link mechanism to move the work apparatus upward and downward. The power extractor is connectable to a power input of the work apparatus to take power from a power source and supply the power to the work apparatus. The power extractor is located at a position lower than a lowest position of the right lower link and a lowest position of the left lower link.

23 Claims, 10 Drawing Sheets

(56) References Cited

FOREIGN PATENT DOCUMENTS

| JP | 2005-073629 A | 3/2005 |
| JP | 2005-237298 A | 9/2005 |
| JP | 2006-109738 A | 4/2006 |
| JP | 2007-300810 A | 11/2007 |

OTHER PUBLICATIONS

Official Communication issued in corresponding Japanese Patent Application No. 2021-092543, drafted on Mar. 28, 2024.
Official Communication issued in corresponding Japanese Patent Application No. 2021-092544, drafted on Mar. 25, 2024.

\* cited by examiner

WORK VEHICLE

CROSS REFERENCE TO RELATED APPLICATIONS

This application claims the benefit of priority to Japanese Patent Applications No. 2021-092543 and No. 2021-092544 each filed on Jun. 1, 2021. The entire contents of these applications are hereby incorporated herein by reference.

BACKGROUND OF THE INVENTION

1. Field of the Invention

The present invention relates to a self-propelled work vehicle.

2. Description of the Related Art

For example, Japanese Unexamined Patent Application Publication, Tokukai, No. 2005-73629 discloses a tractor that includes a power extraction section ("joint shaft" in the publication). A power input section disposed at a work apparatus is connected to the power extraction section, enabling the power extraction section to transfer power from a power source to the work apparatus. The power extraction section disclosed in Japanese Unexamined Patent Application Publication, Tokukai, No. 2005-73629 is disposed at a height substantially same as the height of left and right lower links. In a case of particular specifications and/or standards associated with the work apparatus, it is possible that the height of the work apparatus connected to the power extraction section cannot be reduced to a sufficient height. Accordingly, certain preferred embodiments of the present invention provide combines that each enable a work apparatus to work at a suitable height regardless of specifications and/or standards associated with the work apparatus.

In a tractor disclosed in, for example, Japanese Unexamined Patent Application Publication, Tokukai, No. 2005-73629, a frame body ("auto-hitch" in the publication) is connected to each of a top link and the right and left lower links. In Japanese Unexamined Patent Application Publication, Tokukai, No. 2005-73629, the connection sections ("top hook" in the publication) of the frame body with respect to the top link and the right and left lower links are located at the same height as the height of the connection section ("lower hook" in the publication) of the frame body with respect to the work apparatus. Incidentally, when a tractor performs work using a work apparatus attached to a link mechanism of the tractor, it is important to set the work apparatus to a suitable work height. When, however, the tractor has a particular configuration, it is possible for the link mechanism to be set too high or too low in height, that is, it is possible that the work apparatus cannot be set to a suitable work height. In this case, a possible solution is to provide the work vehicle and the tractor with compatible configurations. If, however, at least one of the tractor or the work apparatus has a special configuration, it is possible for the work apparatus to be not attachable to a general-purpose tractor, or it is possible for the tractor to be not attachable to a general-purpose work apparatus. Accordingly, preferred embodiments of the present invention provide combines that each enable a work apparatus to work at a suitable height.

SUMMARY OF THE INVENTION

According to a first aspect of a preferred embodiment of the present disclosure, a tractor includes a link mechanism including a top link, a right lower link, and a left lower link, the link mechanism being connectable to a work apparatus to move the work apparatus upward and downward, and a power extractor that is connectable to a power input of the work apparatus to take power from a power source and supply the power to the work apparatus. The power extractor is located at a position lower than a lowest position of the right lower link and a lowest position of the left lower link.

According to the first aspect of a preferred embodiment of the present disclosure, the power extractor is located at a position lower than the lowest positions of the right and left lower links. This increases the degree of freedom of the height at which the work apparatus works as compared with a configuration in which the power extractor is located substantially at the same height as the left and right lower links or at a position higher than the positions of the left and right lower links. With the increased degree of freedom, it is easier to realize, regardless of the specifications and/or standards associated with the work apparatus, a configuration to lower the height of the work apparatus connected to the power extractor to a sufficient height. As a result, such a combine is able to work at a suitable height, regardless of the specifications and/or standards associated with the work apparatus.

In one preferred embodiment of the present invention, the power extractor is located at a rear side of a rear end of the right lower link located at its lowest position and a rear end of the left lower link located at its lowest position.

If the lower link is elongated rearward, the center of gravity of the tractor in its front-rear direction tends to be imbalanced rearward. This may increase the moment load involved with the upward movement of the work apparatus. In contrast, the above-described one preferred embodiment makes the center of gravity of the tractor well balanced in its front-rear direction as compared with the configuration in which the power extractor is provided at a position ahead of the rear end of the lower link. As a result, the moment load involved with the upward movement of the work apparatus is reduced or prevented.

In one preferred embodiment of the present invention, the tractor further includes a frame body connected to the top link, the left lower link, and the right lower link. The frame body is connectable to the work apparatus. The power extractor is supported and surrounded by the frame body.

In this configuration, the power extractor is supported by the frame body and surrounded by the frame body. This increases the strength of the support structure for the power extractor. Also in the above configuration, the work apparatus is connected to the frame body. This makes a positional deviation less likely to occur between the power extractor and the power input of the work apparatus. It is to be noted that the power extractor may be surrounded by a portion of the frame body or may be surrounded by the entire frame body.

In one preferred embodiment of the present invention, the tractor further includes a transmission apparatus to change a speed of the power from the power source, the transmission apparatus including a work power output shaft that is located at a position higher than the lowest position of the right lower link and the lowest position of the left lower link to output the power at the changed speed, and a power transfer apparatus connecting the work power output shaft and the power extractor to each other such that the power is transferable between the work power output shaft and the power extractor. The frame body surrounds the power transfer apparatus.

The work power output shaft is located at a position higher than the lowest positions of the right and left lower links, and the power extractor is located at a position lower than the lowest positions of the right and left lower links. With the work power output shaft and the power extractor thus positioned, if the work power output shaft and the power extractor are directly connected to each other, the joint angle at the joint portion between the work power output shaft and the power extractor becomes large. If the joint angle is large, there is a possibility of large noise at the joint portion and/or a possibility of the power extractor pulsating at its downstream portion located at the downstream side in the transmission direction in which power is transferred. In contrast, in the above-described one preferred embodiment, a speed-transmission apparatus is between the work power output shaft and the power extractor, and the speed-transmission apparatus connects the work power output shaft and the power extractor such that power is transferable between the work power output shaft and the power extractor. This configuration of the one preferred embodiment ensures that the power whose speed has been changed by the transmission apparatus is satisfactorily transferred to the power extractor without forcibly extending the work power output shaft from the transmission apparatus or forcibly increasing the joint angle between the work power output shaft and the power extractor. Also in the above configuration, the frame body surrounds the speed-transmission apparatus. This ensures that the speed-transmission apparatus is securely protected by the frame body. Since the speed-transmission apparatus is thus protected, there is a reduced or minimized risk of the speed-transmission apparatus contacting foreign matter. It is to be noted that the frame body may surround a portion of the speed-transmission apparatus or surround the entire speed-transmission apparatus.

In one preferred embodiment of the present invention, the power transfer apparatus is an attachable and detachable power transfer apparatus.

In this configuration, the speed-transmission apparatus is an attachable and detachable speed-transmission apparatus. This facilitates replacement and maintenance of the speed-transmission apparatus.

In one preferred embodiment of the present invention, the frame body is connectable to the work apparatus based on an upward movement of the link mechanism and is disconnectable from the work apparatus based on a downward movement of the link mechanism. The power extractor is supported by the frame body such that the power extractor is swingable about an axis extending in a left-right direction of the tractor.

If the positions and/or orientations of the power extractor and the power input of the work apparatus are deviated with respect to each other as a result of an upward or downward movement of the frame body, it is possible that the power extractor and the power input cannot be smoothly connected to each other. In contrast, in the above-described one preferred embodiment, the power extractor is supported by the frame body while being swingable about an axis extending in the left-right direction. This enables the power extractor to follow the position and/or orientation of the power input. As a result, the power extractor and the power input are smoothly connected to each other.

In one preferred embodiment of the present invention, the tractor further includes a sprocket located at the power extractor to input the power into the power extractor, and a power transfer apparatus to transfer the power to the power extractor. The power transfer apparatus includes a chain wound around the sprocket.

In this configuration, power is transferred to the power extractor through a chain. This configuration enables the chain to transfer power in a vertical direction of the machine body with the power extractor being located at a position lower than the lowest positions of the right and left lower links. This reduces or minimizes the front-rear width of the speed-transmission apparatus, ensuring a configuration in which the power extractor is as close as possible in the front-rear direction to the side at which the link mechanism is located.

In one preferred embodiment of the present invention, the frame body is attachable to and detachable from the link mechanism.

When the work apparatus is a plow or a subsoiler, a large amount of traction load is applied to the tractor. If a work apparatus involves a large amount of traction load, such work apparatus is desirably directly connected to the link mechanism. In contrast, in the above-described one preferred embodiment, the frame body is attachable to and detachable from the link mechanism. This enables a plow, a subsoiler, or some other work apparatus involving a large amount of traction load to be attached to the link mechanism. The configuration of the above-described one preferred embodiment also facilitates replacement and maintenance of the frame body as compared with a configuration in which the frame body is not attachable to and not detachable from the link mechanism.

In one preferred embodiment of the present invention, the tractor further includes a transmission apparatus to change a speed of the power from the power source, the transmission apparatus including a work power output shaft that is located at a position higher than the lowest position of the right lower link and the lowest position of the left lower link to output the power at the changed speed, and a power transfer apparatus connecting the work power output shaft and the power extractor to each other such that the power is transferable between the work power output shaft and the power extractor. The power transfer apparatus includes a lateral shaft connected to the work power output shaft and extending through a position higher than the position of the power extractor to a rear end portion of the right lower link and a rear end portion of the left lower link, and a vertical connector connecting a rear end portion of the lateral shaft and the power extractor to each other to transfer the power along a vertical direction of the tractor.

In this configuration, the lateral shaft is connected to the work power output shaft located at a position higher than the lowest positions of the right and left lower links, and the lateral shaft extends to the rear end portion of each lower link. The vertical connector transfers power along the vertical direction between the rear end portion of the lateral shaft and the power extractor. This reduces the front-rear width of a portion of the speed-transmission apparatus which portion is located behind the rear end portion of each lower link. As a result, such a configuration is realized that the power extractor is as close as possible in the front-rear direction to the side at which the link mechanism is located.

In one preferred embodiment of the present invention, the vertical connector includes an input to which the lateral shaft is connected, and a vertical transfer connector to extend in an up-down direction of the tractor when the link mechanism is located at a lowest position so as to connect the input and the power extractor to each other. The input of the vertical connector overlaps with the power extractor in a front-rear direction of the tractor.

In this configuration, power is transferred along the vertical direction between the lateral shaft passing through a position higher than the position of the power extractor and the power extractor located at a position lower than the lowest positions of the right and left lower links. This reduces or minimizes the front-rear width of the speed-transmission apparatus, ensuring a configuration in which the power extractor is as close as possible in the front-rear direction to the side at which the link mechanism is located.

In one preferred embodiment of the present invention, the vertical connector includes a case in which the vertical transfer connector is contained.

In this configuration, dust or like matter is less likely to enter the vertical transfer connector. This improves, for example, durability of the vertical transfer connector and maintainability of the vertical transfer connector.

In one preferred embodiment of the present invention, the tractor further includes a travel device including a left front wheel, a right front wheel, a left rear wheel, and a right rear wheel, a transmission apparatus to change the power from the power source, and a rear transfer case to transfer the power output from the transmission apparatus to the left rear wheel and the right rear wheel. The rear transfer case includes an upper connector connected to a rear travel output of the transmission apparatus to output the power to the left rear wheel and the right rear wheel, and a lower connector connected to the left rear wheel and the right rear wheel. The upper connector is located at a position higher than a position of the lower connector.

Some tractors have such a configuration that the upper connector of the rear transfer case is located at a position higher than the position of the lower connector of the rear transfer case. A tractor having this configuration is referred to as "high clearance" tractor. A tractor may have a high clearance configuration and such a configuration that the power extractor is located at a position substantially at the same height as the lower link or at a position higher than the positions of the left and right lower links. In this case, the work apparatus is connected to the tractor at a high connection position. In this case, if the work apparatus is not compatible with the high clearance configuration, it is possible that the work apparatus is not able to reach the ground and perform ground work. In contrast, in the above-described one preferred embodiment, the connection position of the work apparatus is lower than the connection position of the work apparatus in the configuration in which the power extractor is substantially at the same height as the lower link or at a position higher than the positions of the left and right lower links. This enables the work apparatus to easily reach the ground even if the work apparatus is not compatible with the high clearance configuration.

According to another aspect of a preferred embodiment of the present disclosure, a tractor includes a link mechanism including a top link, a right lower link, and a left lower link to move a work apparatus upward and downward, and a frame body between the link mechanism and the work apparatus and connecting the link mechanism and the work apparatus to each other. The frame body includes a first frame connected to the top link, the left lower link, and the right lower link, a second frame located behind the first frame and connected to the work apparatus, and a connector connecting the first frame and the second frame to each other. The first frame includes a first connector to which the top link, the left lower link, and the right lower link are connected. The second frame includes a second connector to which the work apparatus is connected. When the link mechanism is located at a lowest position, the first connector is located at a position different from a position of the second connector.

According to the second aspect of a preferred embodiment of the present disclosure, the link mechanism is connected to the first connector of the first frame, and the work apparatus is connected to the second connector of the second frame. The first connector is provided at the first frame, and the second connector is provided at the second frame. This configuration makes it easy to set the first connector and the second connector at different heights as compared with a configuration in which the first connector and the second connector are provided at one frame. Also, the connector connects the first frame and the second frame to each other such that the height of the first frame and the height of the second frame are shifted from each other based on the configuration of the tractor and the configuration of the work apparatus. As a result, such a combine is realized that enables the work apparatus to work at a suitable height.

In one preferred embodiment of the present invention, when the link mechanism is at the lowest position, the position of the second connector is lower than the position of the first connector. Also in one preferred embodiment of the present invention, the second connector includes a portion at a position that is lowest of the second connector and that is lower than a lowest position of the right lower link and a lowest position of the left lower link.

In this configuration, the work apparatus is easily lowered to a sufficiently low level when the link mechanism is located at the lowest position, as compared with a configuration in which the second connector is located at a position same as or higher than the first connector.

In one preferred embodiment of the present invention, the first connector includes a first apex portion to which a free end portion of the top link is connected, a left first bottom corner portion to which the left lower link is connected, and a right first bottom corner portion to which the right lower link is connected. The first frame has a triangular shape defined by the first apex portion, the left first bottom corner portion, and the right first bottom corner portion. The second connector includes a second apex portion to which a first connection tool of the work apparatus is connected, a left second bottom corner portion to which a second connection tool of the work apparatus is connected, and a right second bottom corner portion to which a third connection tool of the work apparatus is connected. The second frame has a triangular shape defined by the second apex portion, the left second bottom corner portion, and the right second bottom corner portion. The connector includes an apex frame extending between the first apex portion and the second apex portion, a left bottom corner frame extending between the left first bottom corner portion and the left second bottom corner portion, and a right bottom corner frame extending between the right first bottom corner portion and the right second bottom corner portion.

In this configuration, each of the first frame and the second frame has a triangular shape. The apexes of the triangular shape of the first frame are connected to the apexes of the triangular shape of the second frame by the connector. This ensures that the first frame and the second frame are firmly connected to each other without a complicated configuration. Also, the connector connects the apexes of the triangular shape of the first frame to and the apexes of the triangular shape of the second frame. This makes the shape of the connector a simple shape made up of minimum portions or elements. As a result, the force transmission efficiency of each of the first frame and the second frame improves. As used herein, the term "triangular shape" encompasses substantially triangular shapes.

In one preferred embodiment of the present invention, the triangular shape of the first frame is the same or substantially the same as the triangular shape of the second frame.

In this configuration, the first frame and the second frame are implemented by frames having the same shapes or substantially the same shapes. This makes the configuration of the frame body simplified, which is advantageous in terms of cost. As used herein, the term "same triangular shape" encompasses substantially the same triangular shape, the same substantially triangular shape, and substantially the same substantially triangular shape.

In one preferred embodiment of the present invention, the second connector includes a lockable body lockable to a connection tool of the work apparatus, and a locking mechanism to keep the lockable body in a locked state. While the locking mechanism is keeping the locked state of the lockable body, the second connector and the work apparatus are kept in a connected state in which the second connector and the work apparatus are connected to each other. Upon the locking mechanism releasing the locked state of the lockable body, the connected state between the second connector and the work apparatus is released. The tractor further includes an operation tool located at a position at which the operation tool is manually operable from a driver to switch the locking mechanism between keeping the locked state of the lockable body and releasing the locked state of the lockable body.

The second frame is located at a rear side of the first frame. In this configuration, the distance between the driver and the locking mechanism tends to increase as compared with a configuration in which the first connector and the second connector are provided at one frame. In contrast, in the above-described one preferred embodiment, the operation tool is located at a position at which the operation tool is manually operable from the driver. This ensures that even in a configuration in which the second frame is located at a rear side of the first frame, an operator of the driver is able to easily switch the locking mechanism.

In one preferred embodiment of the present invention, the frame body is operable to disconnect the first frame and the connector from each other, and disconnect the first frame and the connector from each other to remove the connector and the second frame from the first frame. The first frame includes a third connector that is the same or substantially the same as the second connector. The work apparatus is connectable to the third connector with the connector and the second frame being removed from the first frame.

In this configuration, the first frame is connectable to both the link mechanism and the work apparatus. For example, it is possible that the work apparatus cannot be set to a suitable work height if the work apparatus is in a state of being connected to the second connector. In this case, a worker may release the connection between the first frame and the second frame, and connect the work apparatus to the third connector of the first frame. Thus, in the above configuration, the worker is able to select either the second connector or the third connector as the connector. This makes it easier for the worker to set the work apparatus to a suitable work height as compared with a configuration in which the connector of the work apparatus is only the second connector.

In one preferred embodiment of the present invention, the tractor further includes a transmission apparatus to change a speed of power from a power source and including a work power output shaft to output the power at the changed speed, a power extractor that is connectable to a power input of the work apparatus to take the power from the power source and supply the power to the work apparatus, and a power transfer apparatus connecting the work power output shaft and the power extractor to each other in such a manner that the power is transferable between the work power output shaft and the power extractor. The work power output shaft and the power extractor have such a height relationship that the work power output shaft and the power extractor are located at different heights, the height relationship being the same or substantially the same as a height relationship a height relationship between the first connector and the second connector. The work power output shaft is surrounded by the first frame, and the power extractor is surrounded by the second frame.

In this configuration, the difference in height between the work power output shaft and the power extractor is the same or substantially the same as the difference in height between the first connector and the second connector. In other words, the power extractor is made low with respect to the work power output shaft by a height that is the same or substantially the same as the difference in height between the first connector and the second connector. A speed-transmission apparatus is located between the work power output shaft and the power extractor, and the speed-transmission apparatus transfers power from the work power output shaft to the power extractor. This ensures that power can be transferred to the power input of the work apparatus without changing the height relationship between the link mechanism and the work power output shaft of the tractor. It is to be noted that the first frame may surround a portion of the work power output shaft or may surround the entire work power output shaft. It is also to be noted that the second frame may surround a portion of the power extractor or may surround the entire power extractor.

In one preferred embodiment of the present invention, the frame body is connectable to the work apparatus based on an upward movement of the link mechanism and is disconnectable from the work apparatus based on a downward movement of the link mechanism.

In this configuration, the worker is able to connect and disconnect the work apparatus only by moving the link mechanism upward or downward. Thus, the work of connecting the work apparatus and the work of disconnecting the work apparatus are facilitated.

In one preferred embodiment of the present invention, the tractor further includes a travel device including a left front wheel, a right front wheel, a left rear wheel, and a right rear wheel, a transmission apparatus to change power from a power source, and a rear transfer case to transfer the power output from the transmission apparatus to the left rear wheel and the right rear wheel. The rear transfer case includes an upper connector connected to a rear travel output of the transmission apparatus, the rear travel output being configured to output the power to the left rear wheel and the right rear wheel, and a lower connector connected to the left rear wheel and the right rear wheel. The upper connector is located at a position higher than a position of the lower connector.

Some tractors have a configuration such that the upper connector of the rear transfer case is located at a position higher than the position of the lower connector of the rear transfer case. A tractor having this configuration is referred to as a "high clearance" tractor. A tractor may have a high clearance configuration and such a configuration that the power extractor is located at a position substantially at the same height as the lower link or at a position higher than the positions of the left and right lower links. In this case, the work apparatus is connected to the tractor at a high connection position. In this case, if the work apparatus is not compatible with the high clearance configuration, it is possible that the work apparatus is not able to reach the ground and perform ground work. In contrast, in the above-described one preferred embodiment, the first connector of the first frame and the second connector of the second frame can be set to different heights. This enables the work apparatus to easily reach the ground even if the work apparatus is not compatible with the high clearance configuration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In FIGS. 1 to 11, an arrow indicated by "F" indicates a forward direction, an arrow indicated by "B" indicates a rearward direction, an arrow indicated by "U" indicates an upward direction, an arrow indicated by "D" indicates a downward direction, an arrow indicated by "R" indicates a rightward direction, and an arrow indicated by "L" indicates a leftward direction.

Figure 1:
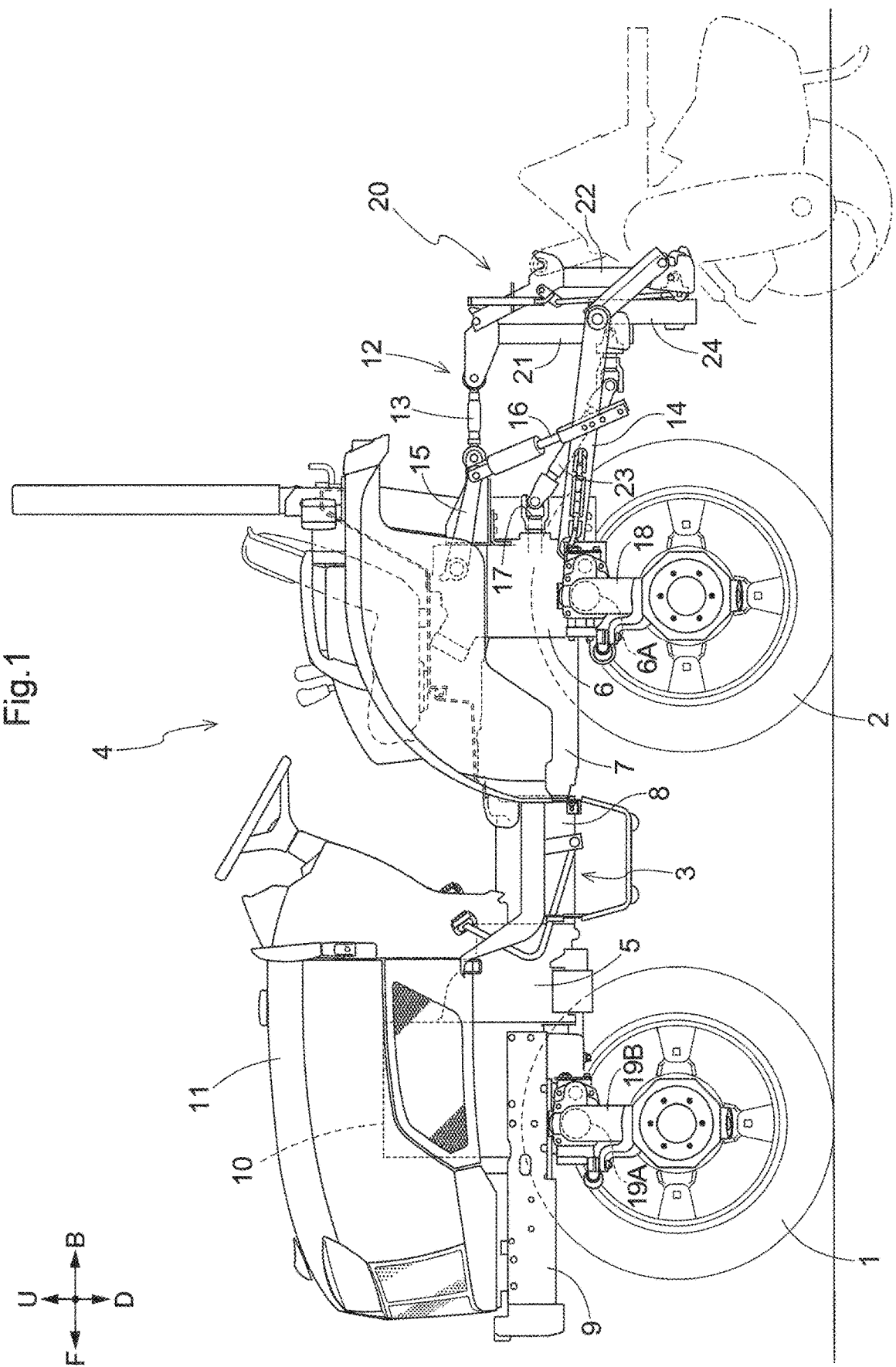
FIG. 1 is a left side view of an entirety of a tractor to which an auto-hitch mechanism is attached.
Figure 2:
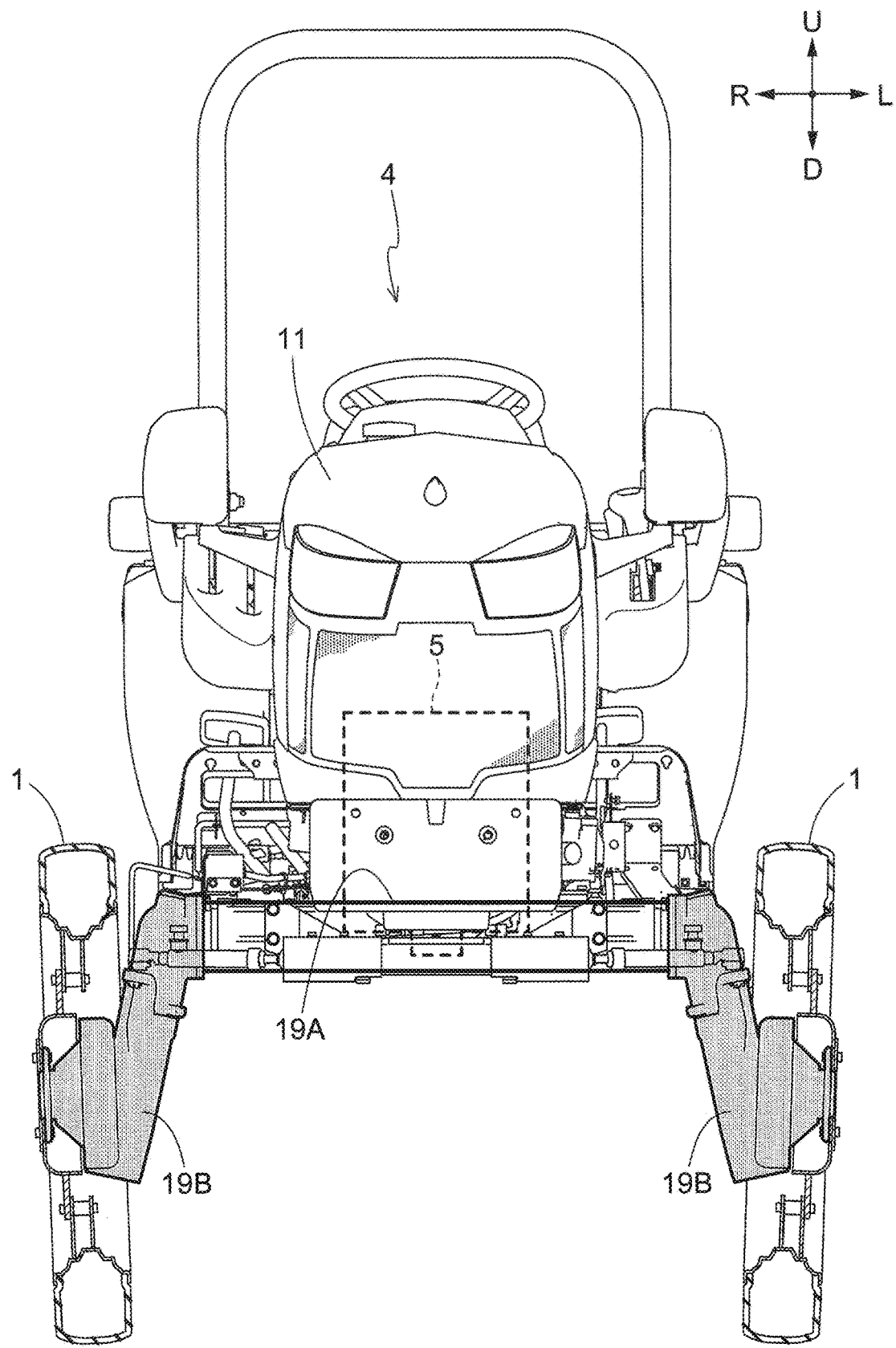
FIG. 2 is a front view of the entirety of the tractor.
Figure 3:
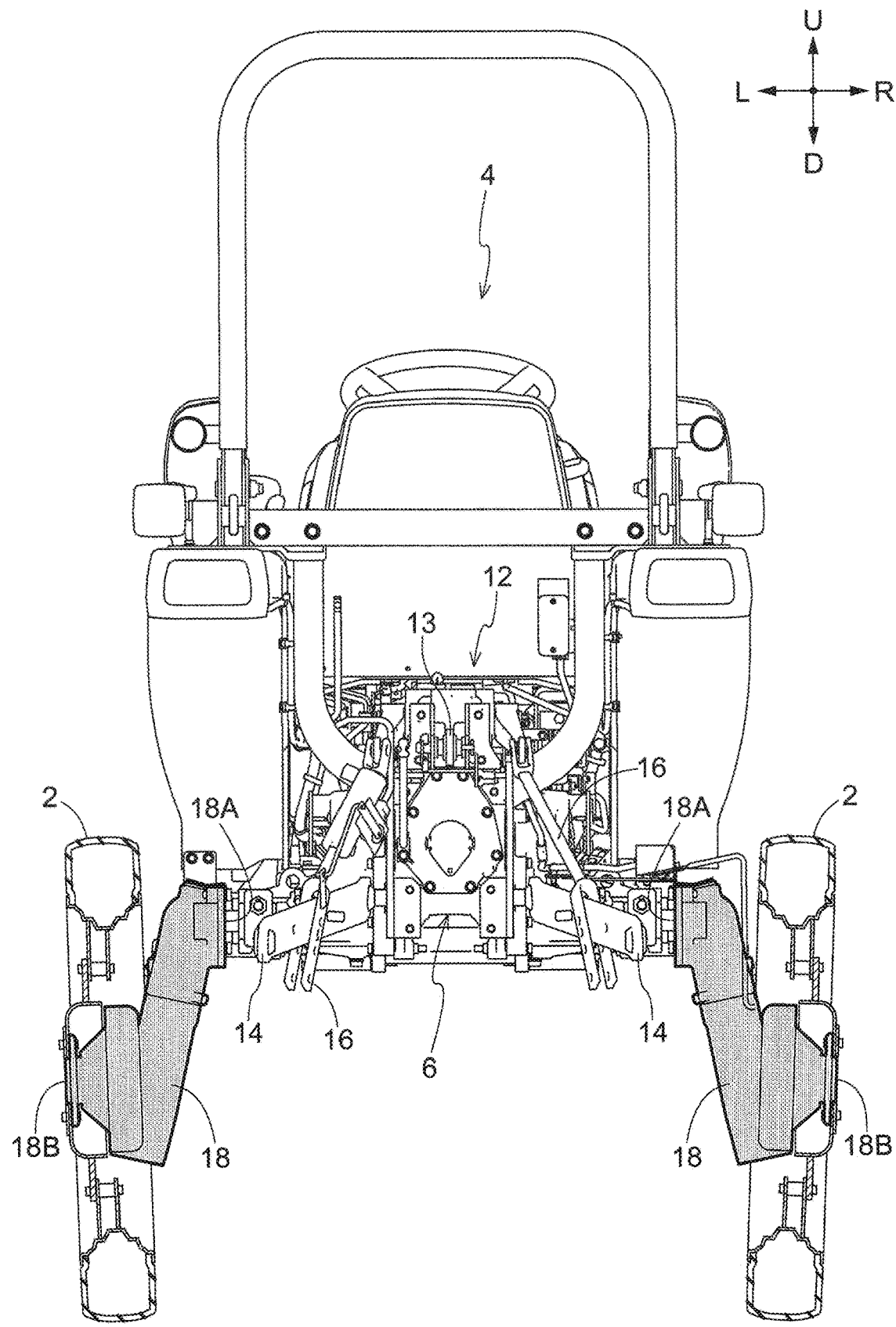
FIG. 3 is a rear view of the entirety of the tractor.

As illustrated in FIGS. 1 to 3, a machine body 3 is supported by left and right front wheels 1 and left and right rear wheels 2. A driver section 4 is provided at a machine body 3. The left and right front wheels 1 and the left and right rear wheels 2 are non-limiting examples of a "travel device" according to a preferred embodiment of the present invention.

As illustrated in FIGS. 1 to 3, the machine body 3 includes a front transmission case 5, a rear transfer case 6, a hydrostatic continuously variable transmission apparatus 7, a machine body frame 8, left and right body frames 9, and an engine 10. The engine 10 is a non-limiting example of a "power source" according to a preferred embodiment of the present invention. The continuously variable transmission apparatus 7 is connected to a front portion of the rear transfer case 6. The machine body frame 8, which is channel-shaped, is disposed between and connected to the front transmission case 5 and the continuously variable transmission apparatus 7. The left and right body frames 9 are connected to the front transmission case 5 and disposed along a front-rear direction of the machine body 3. The left and right front wheels 1 are supported by the respective machine body frames 9. The left and right rear wheels 2 are supported by the rear transfer case 6.

The engine 10 is connected to a front portion of the front transmission case 5 and to upper portions of the machine body frames 9. The engine 10 is covered by a hood 11. The power of the engine 10 is transferred to a transfer shaft (not illustrated) and a transfer gear (not illustrated) that are disposed inside the front transmission case 5. A transfer shaft (not illustrated) is disposed between the front transmission case 5 and the continuously variable transmission apparatus 7. This transfer shaft is connected to the front transmission case 5 and the continuously variable transmission apparatus 7, respectively. Via this transfer shaft, the power of the engine 10 is transferred from the front transmission case 5 to the continuously variable transmission apparatus 7.

The front transmission case 5 is a non-limiting example of the "transmission apparatus" according to a preferred embodiment of the present invention. The front transmission case 5 includes a PTO shaft 17 and changes the speed of the power from the engine 10. The PTO shaft 17 extends from the front transmission case 5 to a rear end portion of the machine body 3. The power whose speed has been changed by the front transmission case 5 is distributed to the continuously variable transmission apparatus 7 and the PTO shaft 17. The PTO shaft 17 is a non-limiting example of the "work power output shaft" according to a preferred embodiment of the present invention.

The continuously variable transmission apparatus 7 is steplessly variable between forward driving and rearward driving. The power of the continuously variable transmission apparatus 7 is transferred to the left and right rear wheels 2 via a subsidiary transmission (not illustrated) and a rear wheel differential (not illustrated) that are disposed inside the rear transfer case 6. The power from the continuously variable transmission apparatus 7 is branched at a position immediately before the rear wheel differential apparatus. The branched power passes through a transfer shaft (not illustrated) disposed between and connected to the rear transfer case 6 and the front transmission case 5; passes through a transfer shaft (not illustrated) that is used for front wheel transmission of the power of the front transmission case 5; and is transferred to the front wheel differential apparatus (not illustrated). Consequently, the branched power is transferred to the left and right front wheels 1.

A left rear transfer case 18 is disposed to the left of the rear transfer case 6, and a right rear transfer case 18 is disposed to the right of the rear transfer case 6. In the rear view illustrated in FIG. 3, the left and right rear transfer cases 18 are surrounded by bold lines and shaded. That is, the rear view illustrated in FIG. 3 clearly illustrates the left and right rear transfer cases 18. One rear travel output section 6A is disposed at a left side portion of the rear transfer case 6, and another rear travel output section 6A is disposed at a right side portion of the rear transfer case 6. The rear travel output sections 6A output power to the respective left and right rear wheels 2. A lateral inner end portion 18A of the left rear transfer case 18 is connected to the one rear travel output section 6A of the rear transfer case 6. A lateral inner end portion 18A of the right rear transfer case 18 is connected to the another rear travel output section 6A. Each of the left and right rear transfer cases 18 has a laterally outer portion that extends downward. A machine-body laterally outer end portion 18B of each rear transfer case 18 is connected to the corresponding one of the rear wheels 2. With this configuration, each of the left and right rear transfer cases 18 transfers the power output from the rear transfer case 6 to the corresponding one of the left and right rear wheels 2. The power output from the rear transfer case 6 is transferred from each rear travel output section 6A to the corresponding one of the rear wheels 2 via a transfer shaft (not illustrated) disposed inside the corresponding one of the rear transfer cases 18. As a result, the left and right rear wheels 2 are brought into rotation. The lateral inner end portion 18A of each rear transfer case 18 is a non-limiting example of the "upper connector" according to a preferred embodiment of the present invention, and the laterally outer end portion 18B of each rear transfer case 18 is a non-limiting example of the "lower connector" according to a preferred embodiment of the present invention. In each rear transfer case 18, the upper connector connected to the rear travel output section 6A is disposed at a position higher than the position of the lower connector connected to the rear wheel 2.

A first front transmission case 19A is disposed in front of the front transmission case 5. The first front transmission case 19A extends along a lateral direction of the machine body 3. A left second front transmission case 19B is disposed to the left of the first front transmission case 19A, and a right second front transmission case 19B is disposed to the right of the first front transmission case 19A. In the front view illustrated in FIG. 2, the first front transmission case 19A is illustrated in such a clear manner that the first front transmission case 19A is indicated by bold lines and that other members positioned in front of the first front transmission case 19A are made transparent. Also in the front view illustrated in FIG. 2, the left and right second front transmission cases 19B are surrounded by bold lines and shaded. Each of the left and right second front transmission cases 19B has a machine-body laterally inner end portion. The first front transmission case 19A has machine-body laterally outer end portions. The machine-body laterally inner end portion of each second front transmission case 19B is connected to the corresponding one of the machine-body laterally outer end portions of the first front transmission case 19A. Each of the right and left second front transmission cases 19B has a machine-body laterally outer portion that extends downward. A laterally outer end portions of each second front transmission case 19B is connected to the corresponding one of the front wheels 1. The front-wheel-transmission power of the front transmission case 5 is transferred to the front wheels 1 via a front wheel differential apparatus (not illustrated) and a transfer shaft (not illustrated) that are disposed inside the first front transmission case 19A; and a transfer gear (not illustrated) that is disposed inside each second front transmission case 19B. As a result, the left and right front wheels 1 are brought into rotation. In each second front transmission case 19B, the portion of the second front transmission case 19B connected to the corresponding machine-body laterally outer portion of the first front transmission case 19A is disposed at a position higher than the position of the portion of the second front transmission case 19B connected to the front wheel 1.

Thus, the tractor described in this preferred embodiment has a "high clearance" configuration. As illustrated in FIGS. 2 and 3, the left and right rear transfer cases 18 extend downward from the respective left and right side portions of the rear transfer case 6, and the second front transmission cases 19B extend downward from the respective left and right end portions of the first front transmission case 19A. That is, the travel device according to this preferred embodiment of the present invention has a substantially gate shape in a front view of the machine body 3 and a rear view of the machine body 3. In this configuration, there exists such a space below the machine body 3 that growing crops can remain standing. The left and right front wheels 1 swing about a vertical axis of the first front transmission case 19A. The left and right rear wheels 2 swing about respective vertical axes of the rear transfer cases 18. The tractor according to this preferred embodiment is capable of four-wheel steering. In particular, the tractor according to this preferred embodiment is suitable for intertillage work performed between ridges in farm fields.

A three-point link mechanism 12 is connected to a rear end portion of the machine body 3 (a rear lower portion of the rear transfer case 6) in such a manner that the three-point link mechanism 12 is swingable upward and downward. The three-point link mechanism 12 moves the work apparatus upward and downward. The three-point link mechanism 12 is a non-limiting example of the "link mechanism" according to a preferred embodiment of the present invention. In this preferred embodiment, examples of the work apparatus include, but will not be limited to, a mid-ridge intertillaging and weeding management machine, a cultivator, a disc harrow, a power harrow, a seeding machine, and a spreader for fertilizer, herbicide, or the like.

The three-point link mechanism 12 includes a single top link 13, right and left lower links 14, and right and left lift arms 15, which are vertically swingable. Each lower link 14 is connected to the rear end portion of the machine body 3 in such a manner that the each lower link 14 is vertically swingable. A linkage rod 16 is disposed between and connected to the right lift arm 15 and the right lower link 14. When the left and right lift arms 15 are operated to swing upward and downward, the left and right lower links 14 swing upward and downward, causing the work apparatus to move upward and downward.

The PTO shaft 17 is disposed at the rear end portion of the machine body 3. The PTO shaft 17 transmits rotational force from the engine 10 to the work apparatus via a universal joint 23. The PTO shaft 17 is disposed at a position higher than the lowest positions of the lower links 14, and outputs rotational power. The universal joint 23 is connected to the PTO shaft 17 and extends from the PTO shaft 17 to a rear end portion of each lower link 14.

As described above, the tractor described in this preferred embodiment has a "high clearance" configuration. The height of the three-point link mechanism 12 of the high-clearance tractor is greater than the height of a three-point link mechanism of a same-class, general-purpose tractor without a high clearance configuration. If the work apparatus is connected to the three-point link mechanism 12, which is disposed at a high position, the connection position at which the work apparatus is connected to the three-point link mechanism 12 is located at a high position. In this case, if the work apparatus is not compatible with the high clearance configuration, it is possible that the work apparatus is not able to reach the ground and perform the ground work.

A possible solution for this issue is to lower the height of the three-point link mechanism 12. In this case, however, the universal joint 23, which is connected to the PTO shaft 17 and a power input shaft 50 of the work apparatus (see FIGS. 9 and 10, which also applies in the following description), is largely inclined in such a "lower the rearward" manner that as a portion of the universal joint 23 is further rearward in position, the portion is lower in position. If the universal joint 23 is largely inclined in this manner, there is a large two-shaft angle difference at the joint portion at which the PTO shaft 17 and the universal joint 23 are joined to each other. Also if the universal joint 23 is largely inclined such that its lower portion extends rearward and downward, there is also a large two-shaft angle difference at the joint portion at which the universal joint 23 and the power input shaft 50 of the work apparatus are joined to each other. If the two-shaft angle differences at the joint portions become large, there is a possibility of large noise at the joint portions and/or a possibility of a power extraction shaft 25c making uneven speed rotation and/or pulsation.

Another possible solution for the above-described issue is to extend the rear end portion of each lower link 14 further rearward. In this configuration, however, the work apparatus is positioned farther rearward with respect to the machine body 3. This may cause an imbalance of the center of gravity in the front-rear direction of the tractor such that the center of gravity is biased rearward, and/or may increase the moment load involved with the upward movement of the work apparatus.

In order to solve the above-described issue, this preferred embodiment includes an auto-hitch mechanism 20 illustrated in FIGS. 1 and 4 to 6. The auto-hitch mechanism 20 is attachable to the three-point link mechanism 12. The auto-hitch mechanism 20 is connectable to rear end portions of the top link 13 and the lower links 14. The work apparatus is connected to the three-point link mechanism 12 via the auto-hitch mechanism 20 in such a manner that the work apparatus is movable upward and downward. It is to be noted that the rear view illustrated in FIG. 3 illustrates a state in which the auto-hitch mechanism 20 is not connected to the three-point link mechanism 12.

The auto-hitch mechanism 20 includes a first frame 21, a second frame 22, a vertical transmission mechanism 24, a power extraction section 25, a connector 26, left and right locking mechanisms 27, and an operation lever 28. The first frame 21 and the second frame 22 are non-limiting examples of the "frame body" according to a preferred embodiment of the present invention. The first frame 21 and the second frame 22 are disposed between the three-point link mechanism 12 and the work apparatus, and connect the three-point link mechanism 12 and the work apparatus to each other. The operation lever 28 is a non-limiting example of the "operation tool" according to a preferred embodiment of the present invention.

The first frame 21 is connected to the top link 13 and the lower links 14. The first frame 21 is attachable to and detachable from the three-point link mechanism 12. That is, the work apparatus is directly attachable to the three-point link mechanism 12 without the intermediation of the auto-hitch mechanism 20. The second frame 22 is disposed at a rear side of the first frame 21. To the second frame 22, the work apparatus is connectable. The connector 26 connects the first frame 21 and the second frame 22 to each other.

Figure 5:
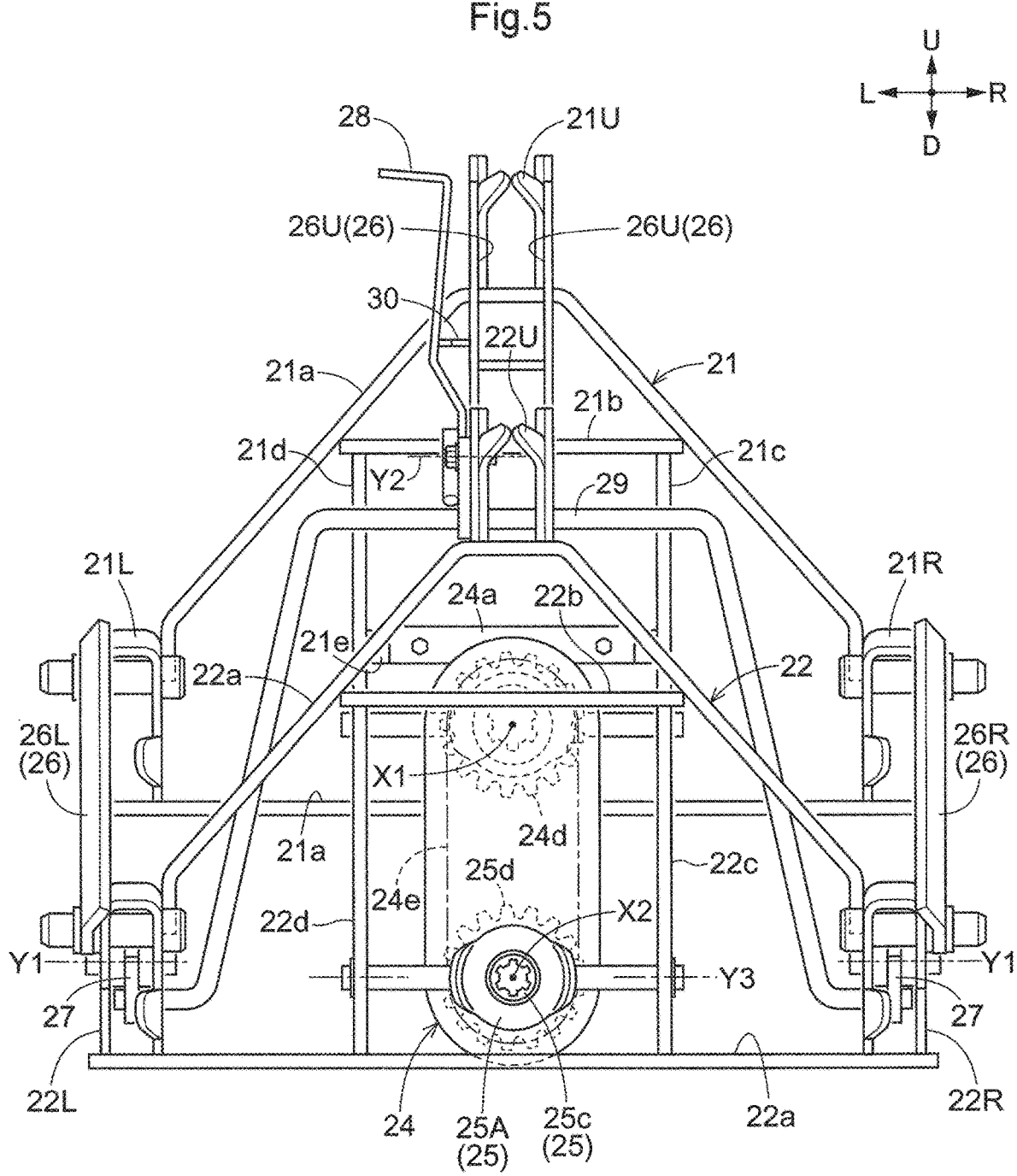
FIG. 5 is a rear view of the auto-hitch mechanism.

As illustrated in FIG. 5, the first frame 21 includes a first outer-diameter frame 21a, a first right vertical frame 21c, a first left vertical frame 21d, a first lateral frame 21b, and a lateral frame 21e. The lateral frame 21e is disposed below the first lateral frame 21b. The first outer-diameter frame 21a, the first right vertical frame 21c, the first left vertical frame 21d, the first lateral frame 21b, and the lateral frame 21e are connected to each other by welding.

The first outer-diameter frame 21a has a substantially triangular shape in a rear view of the machine body 3. At least upper portions of left and right side portions of the first outer-diameter frame 21a are inclined such that more of the upper portions are located in a left-right center region of the first frame 21 as the upper portions are located upper in the upward direction. Left and right end portions of the first lateral frame 21b are respectively connected to left and right inclined portions of the first outer-diameter frame 21a. The first lateral frame 21b extends along the lateral direction of the machine body 3.

In the area inside the first outer-diameter frame 21a, the first right vertical frame 21c and the first left vertical frame 21d are provided side by side with each other in a left-right direction of the machine body 3, and extend in the up-down direction. An upper end portion of the first right vertical frame 21c is connected to a right end portion of the first lateral frame 21b, and an upper end portion of the first left vertical frame 21d is connected to a left end portion of the first lateral frame 21b. Lower end portions of the first right vertical frame 21c and the first left vertical frame 21d are connected to a bottom portion of the first outer-diameter frame 21a.

A left end portion of the lateral frame 21e is connected to the first left vertical frame 21d, and a right end portion of the lateral frame 21e is connected to the first right vertical frame 21c. The lateral frame 21e extends along the lateral direction of the machine body 3 between the first right vertical frame 21c and the first left vertical frame 21d. Each of the lateral frame 21e and the bottom portion of the first outer-diameter frame 21a is an attachment section of the vertical transmission mechanism 24, described later.

The second frame 22 includes a second outer-diameter frame 22a, a second right vertical frame 22c, a second left vertical frame 22d, and a second lateral frame 22b. The second outer-diameter frame 22a has a substantially triangular shape in the rear view of the machine body 3. At least upper portions of left and right side portions of the second outer-diameter frame 22a are inclined such that more of the upper portions are located in a left-right center region of the second frame 22 as the upper portions are located upper in the upward direction. Left and right end portions of the second lateral frame 22b are respectively connected to left and right inclined portions of the second outer-diameter frame 22a. The second lateral frame 22b extends along the lateral direction of the machine body 3.

In the area inside the second outer-diameter frame 22a, the second right vertical frame 22c and the second left vertical frame 22d are provided side by side with each other in the left-right direction, and extend in the up-down direction. An upper end portion of the second right vertical frame 22c is connected to a right end portion of the second lateral frame 22b, and an upper end portion of the second left vertical frame 22d is connected to a left end portion of the second lateral frame 22b. Lower end portions of the second right vertical frame 22c and the second left vertical frame 22d are connected to a bottom portion of the second outer-diameter frame 22a.

Thus, each of the first frame 21 and the second frame 22 has a hollow skeleton shape. The outer shape of each of the first frame 21 and the second frame 22 is a substantially isosceles-triangular shape. The outer size of the first frame 21 is the same or substantially the same as the outer size of the second frame 22. That is, the first frame 21 and the second frame 22 have the same substantially triangular shapes.

The first frame 21 also includes a first apex portion 21U at an upper end portion of the first frame 21. The first apex portion 21U has a vertically inverted U-shape in a rear view of the auto-hitch mechanism 20. The first apex portion 21U is connected to a free end portion of the top link 13 with a pin. The first frame 21 also includes first bottom corner portions 21L and 21R respectively at left and right end portions of a lower portion of the first frame 21. The left and right first bottom corner portions 21L and 21R are respectively connected to the left and right lower links 14 with pins.

The first apex portion 21U and the first bottom corner portions 21L and 21R will be hereinafter collectively referred to as a "first connector". The first connector is a section of the first frame 21 to which the top link 13 and the lower links 14 are connected. That is, the first connector includes the first apex portion 21U, to which the free end portion of the top link 13 is connected; and the left and right first bottom corner portions 21L and 21R, to which the left and right lower links 14 are respectively connected.

The first apex portion 21U is connected to an upper end portion of the first outer-diameter frame 21a by welding. The first bottom corner portion 21L is connected to a lower left end portion of the first outer-diameter frame 21a by welding. The first bottom corner portion 21R is connected to a lower right end portion of the first outer-diameter frame 21a by welding.

The portion of the first outer-diameter frame 21a which portion is upper than the first bottom corner portion 21L and the first bottom corner portion 21R is inclined such that as the portion is closer to the left-right center of the first outer-diameter frame 21a, the portion is located upper in the upward direction. Also, the bottom portion of the first outer-diameter frame 21a extends along the lateral direction between the first bottom corner portion 21L and the first bottom corner portion 21R. Thus, the first frame 21 has an isosceles-triangular shape (or a substantially isosceles-triangular shape) defined by the first apex portion 21U and the left and right first bottom corner portions 21L and 21R.

The second frame 22 also includes a second apex portion 22U, which is disposed at an upper end portion of the second frame 22; and second bottom corner portions 22L and 22R, which are respectively disposed at left and right end portions of a lower portion of the second frame 22. The second frame 22 is connected to an upper end portion of the second outer-diameter frame 22a by welding. The second bottom corner portion 22L is connected to a lower left end portion of the second outer-diameter frame 22a by welding. The second bottom corner portion 22R is connected to a lower right end portion of the second outer-diameter frame 22a by welding.

The portion of the second outer-diameter frame 22a which portion is upper than the second bottom corner portion 22L and the second bottom corner portion 22R is inclined such that as the portion is closer to the left-right center of the second outer-diameter frame 22a, the portion is located upper in the upward direction. Also, the bottom portion of the second outer-diameter frame 22a extends along the lateral direction between the second bottom corner portion 22L and the second bottom corner portion 22R. The second frame 22 has a substantially isosceles-triangular shape defined by a second apex portion 22U and the right and left second bottom corner portions 22L and 22R.

The second apex portion 22U has a vertically inverted U-shape in the rear view of the auto-hitch mechanism 20. The second apex portion 22U includes a locking depression section 22i. The locking depression section 22i is open at its upper portion. The locking depression section 22i of the second apex portion 22U is capable of locking a known top mast (not illustrated) of the work apparatus. The top mast has a vertically inverted V-shape in a front view or a rear view of the top mast. The top mast also has a space at a position below an upper end portion of the top mast. The space is for the second apex portion 22U to enter. Since this top mast is known, no further description regarding the top mast will be provided here. With the second apex portion 22U inserted in the space, the three-point link mechanism 12 to which the auto-hitch mechanism 20 is attached swings upward, bringing the locking depression section 22i into contact with the upper portion of the top mast from the lower side. As a result, the top mast is locked to the locking depression section 22i. The top mast of the work apparatus is a non-limiting example of the "first connection tool" according to a preferred embodiment of the present invention.

Each of the left and right second bottom corner portions 22L and 22R includes a locking depression section 22j. The locking depression section 22j is open at its rear portion. The work apparatus includes left and right locking pins (not illustrated) respectively engageable with the locking depression sections 22j of the left and right second bottom corner portions 22L and 22R. The left and right locking pins are respectively disposed to the left and right with respect to the above-described top mast of the work apparatus, and are disposed below the top mast of the work apparatus. These locking pins are known and will not be elaborated further upon here. It is to be noted that the power input shaft 50 of the work apparatus is provided below the top mast. With the top mast of the work apparatus locked to the locking depression section 22j, the three-point link mechanism 12 swings upward together with the auto-hitch mechanism 20. This causes the work apparatus to swing about the locking depression section 22i of the second apex portion 22U. In the left side views illustrated in FIGS. 1, 4, and 6, when the three-point link mechanism 12 swings upward together with the auto-hitch mechanism 20, the work apparatus swings clockwise. Then, the left and right locking pins respectively contact the left and right locking depression sections 22j from the rear side, causing the left and right locking pins to be locked respectively to the locking depression sections 22j of the left and right second bottom corner portions 22R and 22L. Thus, the work apparatus is connected to the auto-hitch mechanism 20. Thus, the left and right second bottom corner portions 22L and 22R respectively include the left and right locking depression sections 22j, which are lockable to the locking pins of the work apparatus. The left locking pin of the work apparatus is a non-limiting example of the "second connection tool" according to a preferred embodiment of the present invention. The right locking pin of the work apparatus is a non-limiting example of the "third connection tool" according to a preferred embodiment of the present invention.

Description will be made with regard to releasing of the connection between the work apparatus and the auto-hitch mechanism 20. When the three-point link mechanism 12 swings downward together with the auto-hitch mechanism 20, the work apparatus is grounded. The tractor moves forward at a low speed with the work apparatus grounded and with left and right locking mechanisms 27 (described later) not keeping the locking of the left and right locking pins of the work apparatus. This causes the work apparatus to swing about the locking depression section 22*i* of the second apex portion 22U. In the left side views illustrated in FIGS. 1, 4, and 6, the work apparatus swings counterclockwise. Then, while the work apparatus is swinging, the left and right locking pins of the work apparatus are respectively separated from the left and right locking depression sections 22*j*. Thus, the left and right locking pins are not locked respectively to the locking depression sections 22*j* of the left and right second bottom corner portions 22L, 22R. Then, the three-point link mechanism 12 further swings downward together with the auto-hitch mechanism 20, causing the above-described top mast of the work apparatus to be separated from the locking depression section 22*i*. Thus, the top mast is no longer locked to the locking depression section 22*i*, releasing the connection between the work apparatus and the auto-hitch mechanism 20.

Thus, the second frame 22 of the auto-hitch mechanism 20 is connectable to the work apparatus based on an upward movement of the three-point link mechanism 12, and is disconnectable from the work apparatus based on a downward movement of the three-point link mechanism 12.

The second apex portion 22U and the second bottom corner portions 22L and 22R will be hereinafter collectively referred to as "second connector". The second connector is a section of the second frame 22 to which the work apparatus is connected. That is, the second connector includes the second apex portion 22U and the left and right second bottom corner portions 22L and 22R, to which three connection tools (the top mast and the left and right locking pins) of the work apparatus are connected, respectively.

The connector 26 includes an apex frame section 26U, a left bottom corner frame section 26L, and a right bottom corner frame section 26R. The first apex portion 21U and the second apex portion 22U are connected to each other by an apex frame section 26U. The apex frame section 26U extends between the first apex portion 21U and the second apex portion 22U. The first bottom corner portion 21L and the second bottom corner portion 22L are connected to each other by the left bottom corner frame section 26L. The left bottom corner frame section 26L extends between the first bottom corner portion 21L and the second bottom corner portion 22L. The first bottom corner portion 21R and the second bottom corner portion 22R are connected to each other by the right bottom corner frame section 26R. The right bottom corner frame section 26R extends between the first bottom corner portion 21R and the second bottom corner portion 22R. That is, the connector 26 connects the apexes of the triangular shape of the first frame 21 to the apexes of the triangular shape of the second frame 22. This makes the shape of the connector 26 a simple shape made up of minimum essentials. As a result, the force transmission efficiency of each of the first frame 21 and the second frame 22 improves.

That is, the upper end portions of the first frame 21 and the second frame 22 are connected to each other by the apex frame section 26U; the left end portions of the first frame 21 and the second frame 22 are connected to each other by the left bottom corner frame section 26L; and the right end portions of the first frame 21 and the second frame 22 are connected to each other by the right bottom corner frame section 26R. In this manner, the first frame 21 and the second frame 22 are connected to each other at three points.

An upper end portion of the apex frame section 26U and the first apex portion 21U are connected to each other by welding. A lower end portion of the apex frame section 26U and the second apex portion 22U are connected to each other by welding. An upper end portion of the left bottom corner frame section 26L and the first bottom corner portion 21L are connected to each other by welding. A lower end portion of the left bottom corner frame section 26L and the second bottom corner portion 22L are connected to each other by welding. An upper end portion of the right bottom corner frame section 26R and the first bottom corner portion 21R are connected to each other by welding. A lower end portion of the right bottom corner frame section 26R and the second bottom corner portion 22R are connected to each other by welding. That is, the first frame 21 and the second frame 22 are connected to each other by welding.

Each of the apex frame section 26U, the left bottom corner frame section 26L, and the right bottom corner frame section 26R is inclined in such a "lower rearward" manner that as a portion of each section is further rearward in position, the portion is lower in position. With this configuration, the upper end portion of the second frame 22 is disposed at a position lower than the upper end portion of the first frame 21, and a lower end portion of the second frame 22 is disposed at a position lower than a lower end portion of the first frame 21. The difference in height between the upper end portion of the first frame 21 and the upper end portion of the second frame 22 is the same or substantially the same as the difference in height between the lower end portion of the first frame 21 and the lower end portion of the second frame 22.

The second apex portion 22U is disposed below the first apex portion 21U, and the second bottom corner portions 22L and 22R are disposed below the first bottom corner portions 21L and 21R. That is, when the three-point link mechanism 12 is located at its lowest position, the second connector (the second apex portion 22U and the second bottom corner portions 22L and 22R) is disposed at a position lower than the position of the first connector (the first apex portion 21U and the first bottom corner portions 21L and 21R). That is, the first frame 21 and the second frame 22 of the auto-hitch mechanism 20 are configured such that the first connector and the second connector are disposed at different heights when the three-point link mechanism 12 is located at its lowest position. It is to be noted that the difference in height between the first apex portion 21U and the second apex portion 22U is the same or substantially the same as the difference in height between the first bottom corner portions 21L and 21R and the second bottom corner portions 22L and 22R.

The left and right second bottom corner portions 22L and 22R are the lowest portions among the portions of the second frame 22 that are connected to the work apparatus. The left and right second bottom corner portions 22L and 22R, which are disposed at the lowest positions on the second connector, are disposed at positions lower than the lowest positions of the lower links 14.

Figure 4:
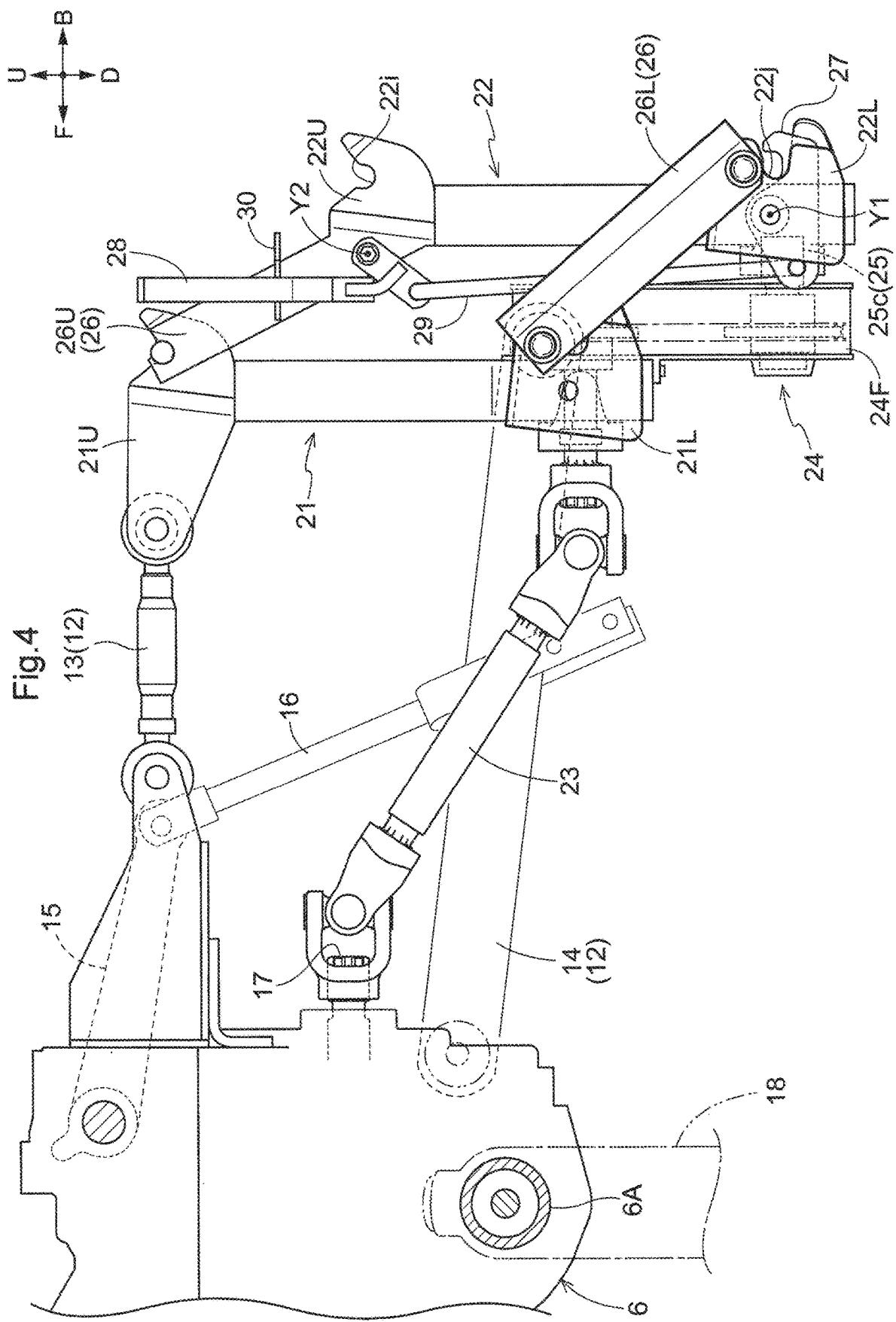
FIG. 4 is an enlarged left side view of the auto-hitch mechanism.
Figure 7:
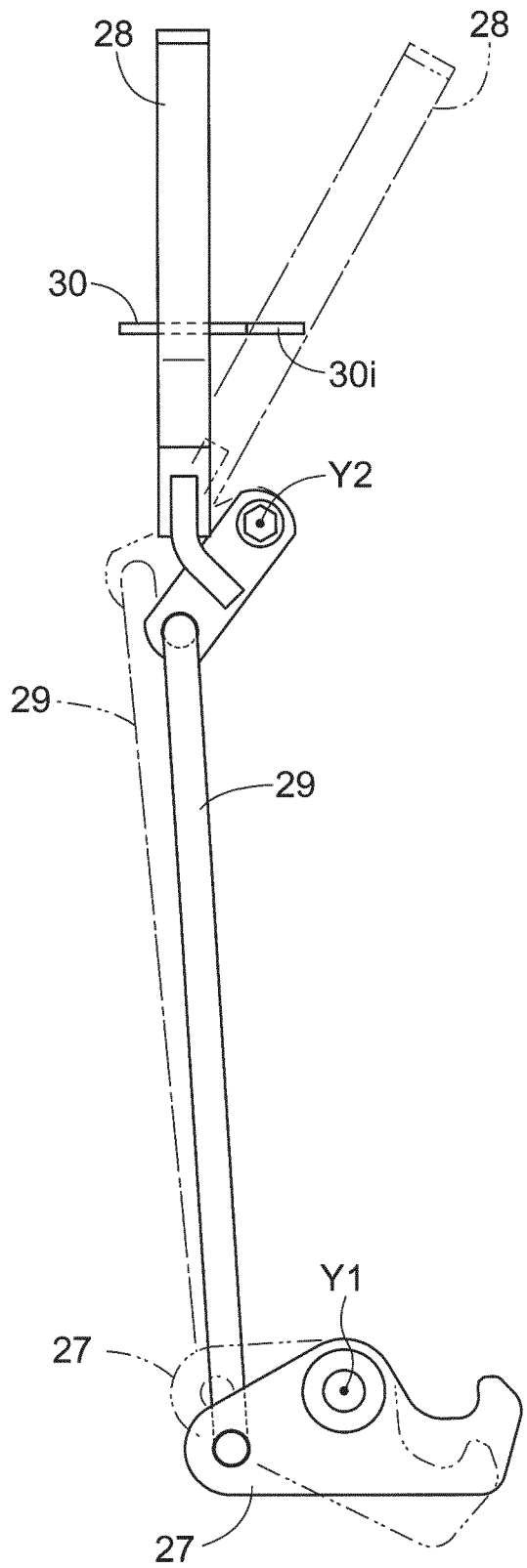
FIG. 7 illustrates, using solid lines and broken lines, how a locking mechanism, an operation lever, and a linkage mechanism move.

As illustrated in FIGS. 4, 5, and 7, a locking mechanism 27 is provided at the portion of the second frame 22 where the left second bottom corner portion 22L is disposed. Another locking mechanism 27 is provided at the portion of the second frame 22 where the right second bottom corner portion 22R is disposed. The locking mechanisms 27, which are disposed at the left and right second bottom corner portions 22L and 22R, keep the locking depression section 22*j* in a locked state.

Each of the left and right second bottom corner portions 22L and 22R has a lateral swing axis Y1 at a portion of each second bottom corner portion which part is disposed at the front side of the locking depression section 22*j*. Each of the left and right locking mechanisms 27 is vertically swingable about the corresponding swing axis Y1. Each of the left and right locking mechanisms 27 is changeable between keeping a locked state and releasing the locked state. While the locked state is kept, each locking mechanism 27 closes the opening of the locking depression section 22j. When the locked state is released, each locking mechanism 27 swings to below the locking depression section 22j to open the opening of the locking depression section 22j.

The second apex portion 22U is engaged with the top mast of the work apparatus, and the left and right second bottom corner portions 22L and 22R are respectively engaged with the left and right locking pins of the work apparatus. In this state, when the left and right locking mechanisms 27 respectively close the openings of the locking depression sections 22j, the work apparatus is kept in a connected state with respect to the auto-hitch mechanism 20. That is, which the locking mechanism 27 is keeping the locked state, the connection state is maintained between the work apparatus and the second connector (the second apex portion 22U, the left and right second bottom corner portions 22L, 22R) of the second frame 22 of the auto-hitch mechanism 20. Specifically, the second connector includes the locking depression section 22i, the locking depression sections 22j, and the locking mechanisms 27. These sections and mechanisms correspond to lockable sections lockable to the connection tools (the top mast and the left and right locking pins) of the work apparatus.

Each of the left and right locking mechanisms 27 is operated by the operation lever 28. At a lower portion of the apex frame section 26U, a swing axis Y2 for the operation lever 28 is disposed. The operation lever 28 is supported by the lower portion of the apex frame section 26U in such a manner that the operation lever 28 is swingable forward and rearward about the swing axis Y2. The operation lever 28 is disposed behind the driver section 4. The operator of the driver section 4 extends the operator's arm rearward from the driver section 4 to grab the operation lever 28 and swing the operation lever 28 forward and rearward. Thus, the operation lever 28, which is for switching the left and right locking mechanisms 27 between keeping the locked state and releasing the locked state, is disposed at a position at which the operation lever 28 is manually operable from the driver section 4.

As illustrated in FIGS. 4, 5, and 7, the left and right locking mechanisms 27 are connected to the operation lever 28 by a linkage mechanism 29. The linkage mechanism 29 is formed by bending a rod-shaped member. A lower portion of the operation lever 28 which portion is disposed below the swing axis Y2 extends forward and downward. A round hole is formed at the lower portion of the operation lever 28. The linkage mechanism 29 passes through the round hole of the operation lever 28. The linkage mechanism 29 includes a left-right center region that passes through the round hole of the operation lever 28 and extends along the lateral direction of the machine body 3. Each of left-right center end portions of the linkage mechanism 29 extends downward and passes through a round hole formed at the corresponding one of the left and right locking mechanisms 27.

When the upper portion of the operation lever 28 swings forward and rearward about the swing axis Y2, the lower portion of the operation lever 28 swings upward and downward, causing the linkage mechanism 29 to be displaced upward and downward. When the operator swings the operation lever 28 forward, the lower portion of the operation lever 28 swings downward, causing the linkage mechanism 29 to be displaced downward. Then, each of the left and right locking mechanisms 27 swings counterclockwise in the left side views of the machine body 3 illustrated in FIGS. 4 and 7. Thus, each locking mechanism 27 keeps the locked state in which the opening of the corresponding locking depression section 22j is closed. As indicated by the broken lines in FIG. 7, when the operator swings the operation lever 28 rearward, the lower portion of the operation lever 28 swings upward, causing the linkage mechanism 29 to be displaced upward. Then, each of the left and right locking mechanisms 27 swings clockwise in the left side views of the machine body 3 illustrated in FIGS. 4 and 7. Thus, each locking mechanism 27 releases the locked state in which the opening of the corresponding locking depression section 22j is open. Upon the locking mechanism 27 releasing the locked state, the connection state becomes releasable between the work apparatus and the second connector (the second apex portion 22U and the left and right second bottom corner portions 22L and 22R) of the second frame 22 of the auto-hitch mechanism 20.

Figure 8:
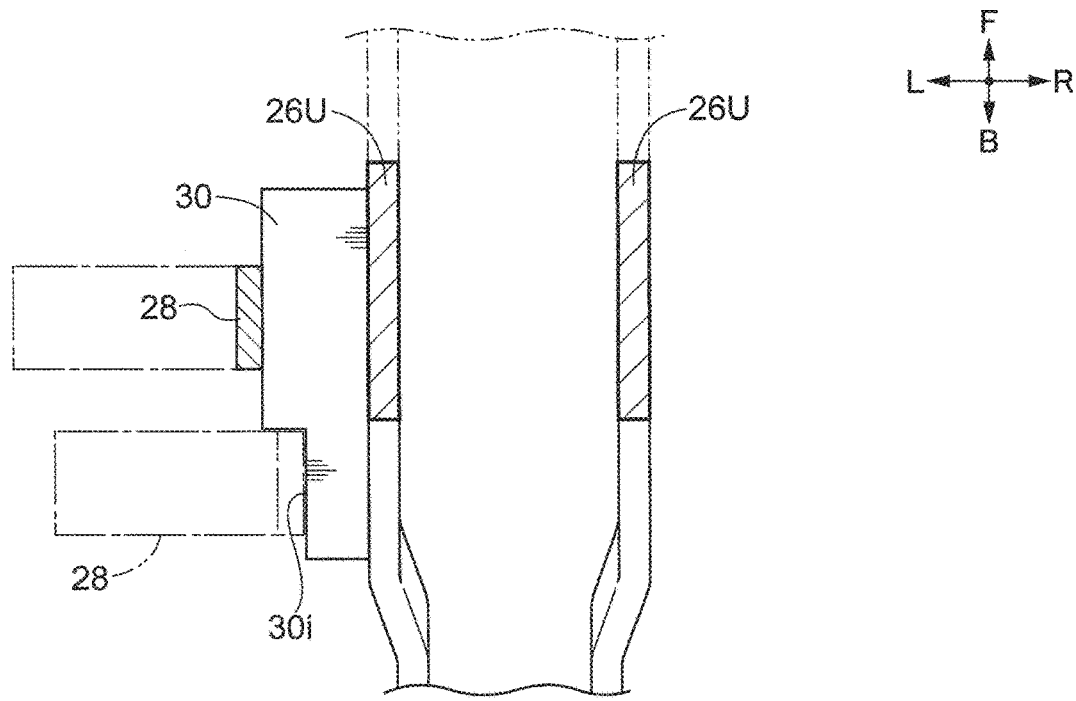
FIG. 8 is a plan view of a stopper of the operation lever.

As illustrated in FIGS. 5, 7, and 8, a stopper section is supported by an up-down center region of the apex frame section 26U. The stopper section 30 has a flat plate shape, and a left edge portion of the stopper section 30 slidably contacts the operation lever 28. A cutout section 30i is formed at the left edge portion of the stopper section 30. That is, the left edge portion of the stopper section 30 has a stepped shape. A portion of the left edge portion of the stopper section 30 which portion is disposed on the front side of the cutout section 30i protrudes to the left of the machine body 3 beyond the cutout section 30i. In this preferred embodiment, the operation lever 28 is made of metal and elastic deformable in the left-right direction. When the operator swings the operation lever 28 rearward, the operation lever 28 enters the cutout section 30i, turning the left and right locking mechanisms 27 into a state of releasing the locking. With this configuration, when the operator releases the connection between the auto-hitch mechanism 20 and the work apparatus, the operator swings the operation lever 28 rearward to lock the operation lever 28 to the cutout section 30i. As a result, the operation lever 28 is prevented from swinging forward, and the left and right locking mechanisms 27 are kept in the state of releasing the locking. In this unlocked state, the operator is able to focus on the work of releasing the connection between the work apparatus and the auto-hitch mechanism 20 without worrying about the state of the operation lever 28.

Figure 6:
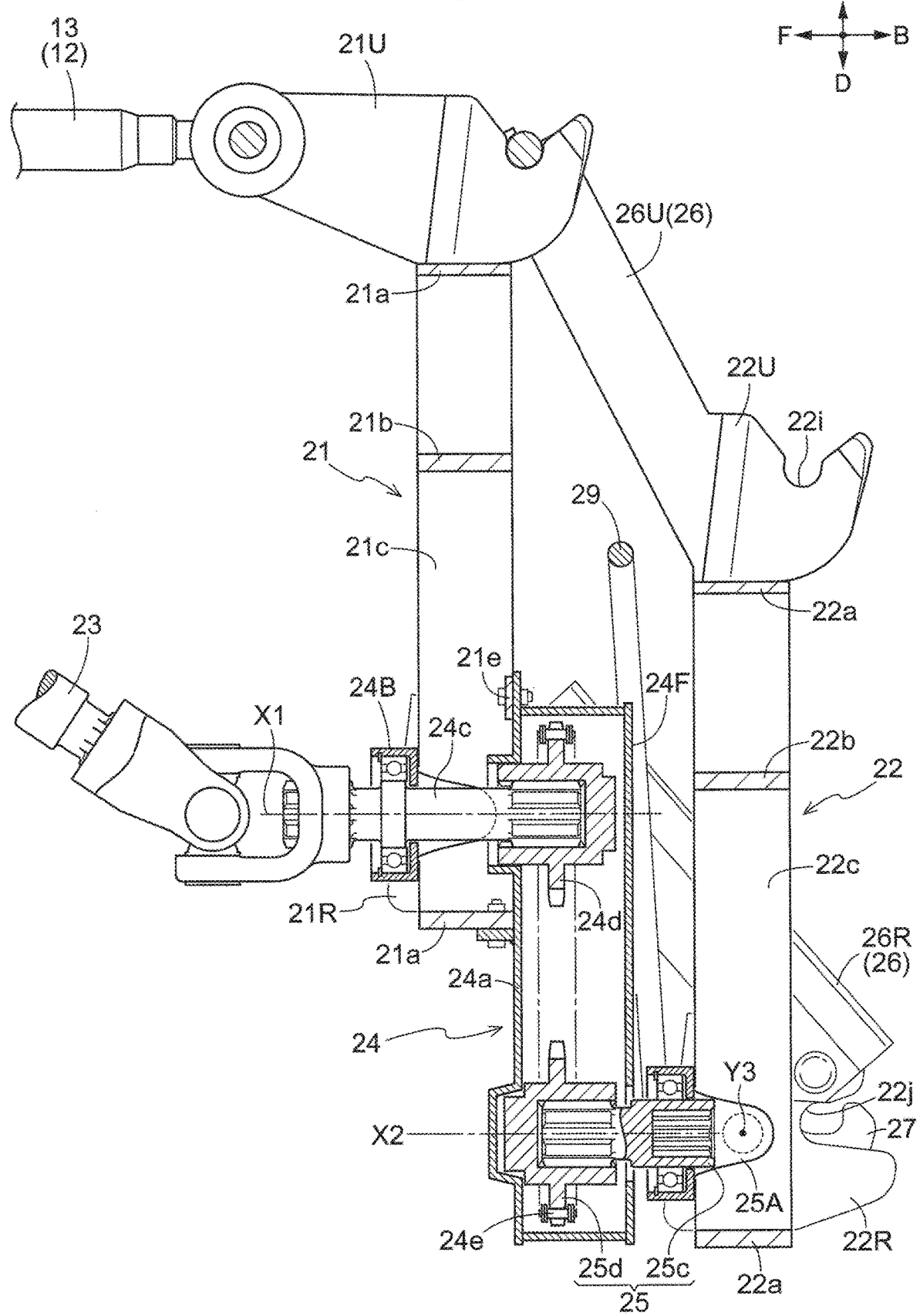
FIG. 6 is a longitudinal sectional view of a speed-transmission apparatus and illustrates its transmission configuration.

As illustrated in FIGS. 4 to 6, the vertical transmission mechanism 24 is supported by the first frame 21 and extends downward below the lower end portion of the first frame 21 in the up-down direction. The power extraction section 25 is supported by the second frame 22, and is disposed below the lower end portion of the first frame 21. The power extraction section 25 is disposed at a position lower than the lowest positions of the lower links 14, and is disposed at the rear side of the rear end portion of each lower link 14 located at its lowest position. The vertical transmission mechanism 24 is a non-limiting example of the "power transfer apparatus" according to a preferred embodiment of the present invention.

The power from the engine 10 is transferred from the PTO shaft 17 to the power extraction section 25 via the universal joint 23 and the vertical transmission mechanism 24. In other words, the universal joint 23 and the vertical transmission mechanism 24 connect the PTO shaft 17 and the power extraction section 25 in such a manner that power is transferable between the PTO shaft 17 and the power extraction section 25. The universal joint 23 is connected to the PTO shaft 17, passes through a position higher than the position of the power extraction section 25, and extends to a rear end portion of each lower link 14. The universal joint 23 and the vertical transmission mechanism 24 are non-limiting examples of the "power transfer apparatus" according to a preferred embodiment of the present invention. The universal joint 23 is a non-limiting example of the "lateral shaft" according to a preferred embodiment of the present invention, and the vertical transmission mechanism 24 is a non-limiting example of the "vertical connector" according to a preferred embodiment of the present invention.

The work apparatus includes the power input shaft 50 (see FIGS. 9 and 10, which also applies in the following description), which is a known power input shaft. The power input shaft 50 of the work apparatus is a non-limiting example of the "power input located at the work apparatus" according to a preferred embodiment of the present invention. The power extraction shaft 25c of the power extraction section 25 is connected to the power input shaft 50 of the work apparatus by a spline structure, enabling the rotational power of the power extraction section 25 to be transferred to the power input shaft 50 of the work apparatus. Thus, the power extraction section 25 is connectable to the power input shaft 50, which is located at the work apparatus, so that the power from the engine 10 is taken to the work apparatus.

The vertical transmission mechanism 24 is disposed between the PTO shaft 17 and the power extraction section 25. As described above, the power extraction section 25 is disposed at a position lower than the lowest positions of the lower links 14. With this configuration, if the universal joint 23 is simply directly connected to the PTO shaft 17 and the power extraction shaft 25c, the universal joint 23 is largely inclined such that its lower portion extends rearward and downward. This causes a large two-shaft angle difference at the joint portion at which the PTO shaft 17 and the universal joint 23 are joined to each other and at the joint portion at which the power extraction shaft 25c and the universal joint 23 are joined to each other. If the two-shaft angle differences at the joint portions become large, there is a possibility of large noise at the joint portions and/or a possibility of the power extraction shaft 25c making uneven speed rotation and/or pulsation. In order to avoid this issue, the vertical transmission mechanism 24 connects the universal joint 23 and the power extraction section 25, and transfers the power from the universal joint 23 along a vertical direction of the machine body 3. A rear end portion of the universal joint 23 is surrounded by the first frame 21. This ensures that the rear end portion of the universal joint 23 is securely protected by the first frame 21, reducing the risk of the rear end portion of the universal joint 23 contacting foreign matter. The rear end portion of the universal joint 23 is a non-limiting example of the "work power output shaft" according to a preferred embodiment of the present invention.

The vertical transmission mechanism 24 is disposed between the first frame 21 and the second frame 22 in the front-rear direction. Also, the vertical transmission mechanism 24 is surrounded by outer peripheral portions of the first frame 21 and the second frame 22 in the rear view of the machine body 3. That is, the first frame 21 and the second frame 22, which correspond to a frame body according to a preferred embodiment of the present invention, are disposed to surround the vertical transmission mechanism 24.

The vertical transmission mechanism 24 includes an attachment plate 24a, an input shaft 24c, an upper sprocket section 24d, an endless rotational-movement chain 24e, and a case 24F. The attachment plate 24a and the case 24F extend upward and downward, and the case 24F covers the attachment plate 24a from the rear side. The upper sprocket section 24d and the endless rotational-movement chain 24e are accommodated in the case 24F. The input shaft 24c and the upper sprocket section 24d are non-limiting examples of the "input" according to a preferred embodiment of the present invention. The endless rotational-movement chain 24e is a non-limiting example of the "vertical transfer connector" and the "chain" according to a preferred embodiment of the present invention.

The vertical transmission mechanism 24 is detachably supported by the first frame 21. Specifically, as illustrated in FIG. 6, the attachment plate 24a is bolted to the lateral frame 21e of the first frame 21 and to a bottom portion of the first outer-diameter frame 21a of the first frame 21.

As illustrated in FIGS. 4 and 6, the input shaft 24c overlaps with the first bottom corner portions 21L and 21R in the side view of the machine body 3. The rear end portion of the universal joint 23 and the input shaft 24c are connected to each other in a region where the universal joint 23 and the input shaft 24c overlap with the first bottom corner portions 21L and 21R in the side view of the machine body 3. The connection portion at which the rear end portion of the universal joint 23 and the input shaft 24c are connected to each other is substantially the same as a connection portion at which a universal joint and a power input shaft of a work apparatus are connected to each other in a conventional auto-hitch unit generally referred to as "A-frame". That is, the universal joint 23 is also applicable to a conventional auto-hitch unit connected to the three-point link mechanism 12. That is, it is not necessary to provide the universal joint 23 with a special configuration for the auto-hitch mechanism 20 according to this preferred embodiment.

The input shaft 24c and the upper sprocket section 24d are integrally formed. The input shaft 24c and the upper sprocket section 24d, which are integrally formed, are supported by a case 24B, the attachment plate 24a, and the case 24F.

The input shaft 24c is disposed at the front side (upstream side in the power transmission direction) of the upper sprocket section 24d. The input shaft 24c and the upper sprocket section 24d are rotatable about a rotation axis X1. With the lower links 14 at their lowest positions or substantially lowest positions, the rotation axis X1 extends along the front-rear direction or substantially along the front-rear direction. The attachment plate 24a has an opening at a portion of the attachment plate 24a corresponding to the input shaft 24c. A front end portion of the input shaft 24c extends forward beyond the attachment plate 24a.

A lower sprocket section 25d, which is to input the power from the upper sprocket section 24d, is disposed below the upper sprocket section 24d. An endless rotational-movement chain 24e is wound around the upper sprocket section 24d and the lower sprocket section 25d. When the three-point link mechanism 12 is located at its lowest position, the endless rotational-movement chain 24e extends along the up-down direction and connects the input shaft 24c and the upper sprocket section 24d to the power extraction section 25. In this manner, the vertical transmission mechanism 24 transfers power downward to the power extraction section 25. In other words, the vertical transmission mechanism 24 has such a configuration that the input shaft 24c and the upper sprocket section 24d overlap with the power extraction section 25 in the front-rear direction. This reduces the front-rear width of the vertical transmission mechanism 24, ensuring that the second connector (the second apex portion 22U, the second bottom corner portions 22L, 22R) and the power extraction section 25 are disposed as closely as possible to the three-point link mechanism 12 in the front-rear direction. This eliminates or minimizes an imbalance of the center of gravity of the tractor in the front-rear direction, that is, the center of gravity of the tractor is less likely to be biased toward the rear side. As a result, the moment load involved with the upward movement of the work apparatus is suppressed.

The power extraction section 25 includes a case 25A, the power extraction shaft 25c, and the lower sprocket section 25d. The lower sprocket section 25d is a non-limiting example of the "sprocket" according to a preferred embodiment of the present invention. The power extraction shaft 25c and the lower sprocket section 25d are integrally formed. The power extraction shaft 25c is disposed at the rear side (the downstream side in the power transmission direction) of the lower sprocket section 25d. The power extraction shaft 25c and the lower sprocket section 25d are rotatable about a rotation axis X2. With the lower links 14 at their lowest positions or substantially lowest positions, the rotation axis X2 extends along the front-rear direction or substantially along the front-rear direction. The power extraction shaft 25c is supported by the case 25A via a ball bearing (not illustrated). The lower sprocket section 25d protrudes to the front side of the machine body 3 beyond the case 25A. The case 24F has an opening at a lower portion of the case 24F. The opening is for the power extraction shaft 25c to pass through. The lower sprocket section 25d is disposed inside the case 24F. The lower sprocket section 25d is surrounded by the attachment plate 24a and the case 24F.

The power extraction section 25 is surrounded by the second frame 22. This ensures that the power extraction section 25 is securely protected by the second frame 22, reducing the risk of the power extraction section 25 contacting foreign matter.

The difference in height between the input shaft 24c and the power extraction shaft 25c is the same or substantially the same as the difference in height between the first apex portion 21U and the second apex portion 22U, the difference in height between the first bottom corner portion 21L and the second bottom corner portion 22L, and the difference in height between the first bottom corner portion 21R and the second bottom corner portion 22R. In other words, the difference in height between the rotation axis X1 and the rotation axis X2 is the same or substantially the same as the difference in height between the first apex portion 21U and the second apex portion 22U, the difference in height between the first bottom corner portion 21L and the second bottom corner portion 22L, and the difference in height between the first bottom corner portion 21R and the second bottom corner portion 22R. That is, the input shaft 24c and the power extraction shaft 25c have such a height relationship that the input shaft 24c and the power extraction shaft 25c are disposed at different heights. This height relationship is similar to a height relationship between the first connector (the first apex portion 21U and the first bottom corner portions 21L and 21R) and the second connector (the second apex portion 22U and the second bottom corner portions 22L and 22R).

Figure 9:
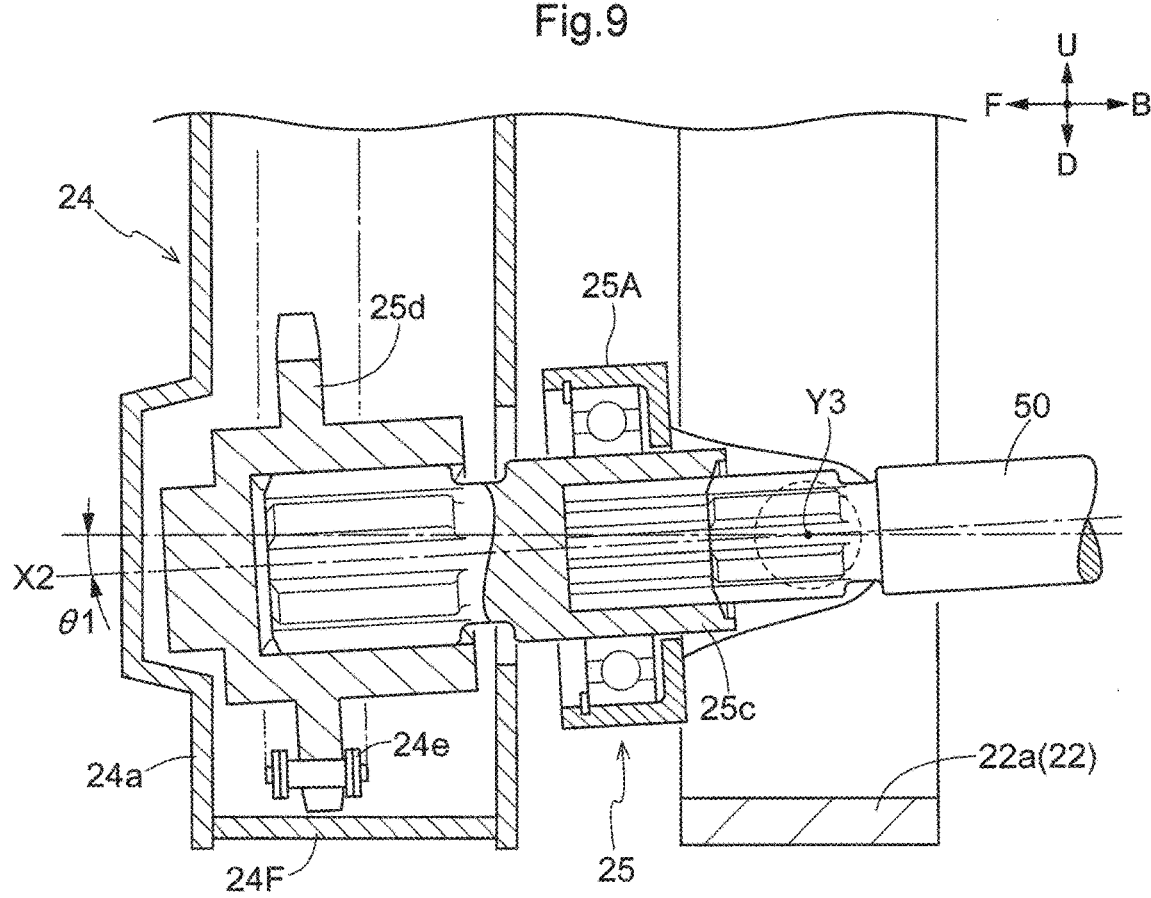
FIG. 9 is a longitudinal sectional view of a power input shaft of a work apparatus and a power extraction shaft, and illustrates the power input shaft starting to fit into the power extraction shaft.
Figure 10:
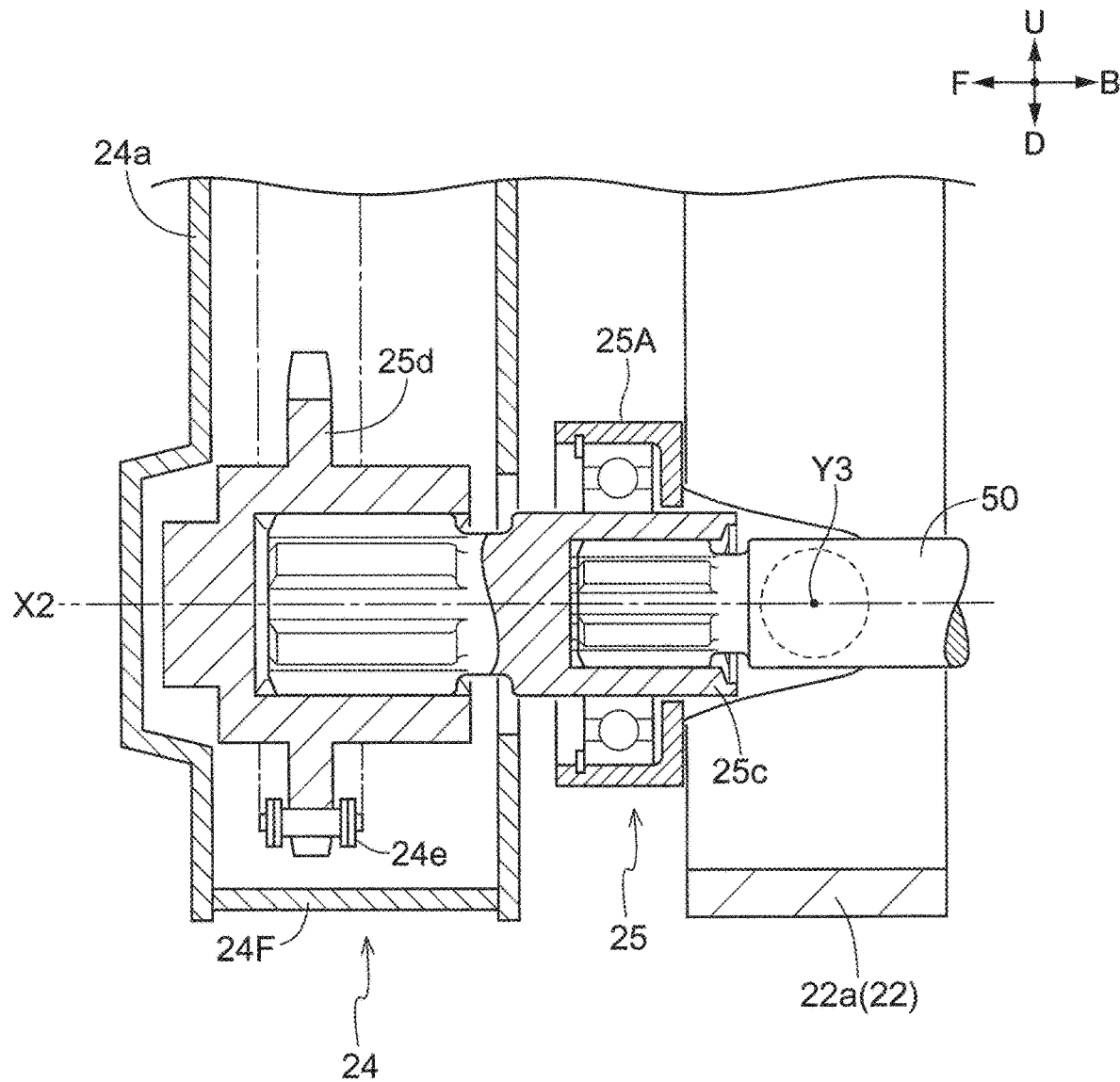
FIG. 10 is a longitudinal sectional view of the power input shaft and the power extraction shaft, and illustrates the power input shaft fitted in the power extraction shaft.

In this preferred embodiment, the power extraction section 25 is supported by the second frame 22 in such a manner that the power extraction section 25 is swingable about an axis Y3 extending in a left-right direction of the machine body 3. The power extraction section 25 is supported by the second frame 22 and surrounded by the first frame 21 and the second frame 22. As illustrated in FIGS. 5, 9, and 10, a left end region and a right end region of the case 25A have bar shapes extending along the lateral direction of the machine body 3. The case 25A is swingably supported by the second right vertical frame 22c and the second left vertical frame 22d of the second frame 22. The case 25A is also swingable about the axis Y3 integrally with the power extraction shaft 25c and the lower sprocket section 25d.

When the power extraction shaft 25c is not connected to the power input shaft 50 of the work apparatus, the rotation axis X2 of the power extraction shaft 25c is inclined downward by an angle of θ1 with respect to a horizontal direction, as illustrated in FIG. 9. As described above, when the three-point link mechanism 12 swings upward together with the auto-hitch mechanism 20 with the top mast of the work apparatus being locked to the locking depression section 22i of the second apex portion 22U, the work apparatus swings about the locking depression section 22i of the second apex portion 22U. At the same time, the power input shaft 50 of the work apparatus swings about the locking depression section 22i of the second apex portion 22U. Then, at the time when a front end portion of the power input shaft 50 of the work apparatus starts to contact a rear end portion of the power extraction shaft 25c, the power input shaft 50 of the work apparatus is inclined downward and frontward by an angle of θ1 with respect to the horizontal direction. This enables the power input shaft 50 and the power extraction shaft 25c of the work apparatus to be fitted with each other by a spline structure.

When the power input shaft 50 of the work apparatus swings farther forward about the locking depression section 22i of the second apex portion 22U, the power input shaft 50 of the work apparatus enters the case 25A. Then, the power input shaft 50 of the work apparatus is fitted farther forward with the power extraction shaft 25c. Here, the inclination angle of the power input shaft 50 of the work apparatus changes to an angle closer to the horizontal direction than to the angle of θ1. Following the change in the inclination angle of the power input shaft 50 of the work apparatus, the case 25A, the power extraction shaft 25c, and the lower sprocket section 25d swing upward about the axis Y3. This ensures that the extension direction of the power extraction shaft 25c and the extension direction of the power input shaft 50 of the work apparatus always coincide with each other. As a result, the power extraction shaft 25c and the power input shaft 50 of the work apparatus are smoothly fitted with each other.

When the work apparatus swings further about the locking depression section 22i of the second apex portion 22U, the connection between the second frame 22 and the work apparatus is completed. Upon completion of the connection, the power input shaft 50 of the work apparatus enters the case 25A, completing the fitting between the power extraction shaft 25c and the power input shaft 50 of the work apparatus. In this fitting state, the rotation axis X2 of the power extraction shaft 25c extends along the horizontal direction. Also in the above fitting state, the power extraction shaft 25c and the power input shaft 50 of the work apparatus are rotatable about the rotation axis X2, which extends in the horizontal direction and along the front-rear direction of the machine body 3.

When the power extraction shaft 25c and the power input shaft 50 of the work apparatus are connected to each other, the power extraction shaft 25c extends in the horizontal direction. This state, however, may cause some loosening of the endless rotational-movement chain 24e, which extends between the upper sprocket section 24d and the lower sprocket section 25d. The loosening of the endless rotational-movement chain 24e, however, would not be great enough to affect power transmission, since the angle θ1 is negligibly small in actual situations. Still, in view of the loosening of the endless rotational-movement chain 24e, it is possible to provide a tension mechanism somewhere in the middle of the rotational-movement track of the endless rotational-movement chain 24e, which extends between the upper sprocket section 24d and the lower sprocket section 25d. The tension mechanism applies a tension force to the endless rotational-movement chain 24e.

Other Preferred Embodiments

The present invention is not limited to the configurations of the above-described preferred embodiments, and other representative preferred embodiments of the present invention will be described below.

In the above-described preferred embodiments, all of the first outer-diameter frame 21a, the first right vertical frame 21c, the first left vertical frame 21d, the first lateral frame 21b, and the lateral frame 21e are connected to each other by welding. For example, each of the first outer-diameter frame 21a, the first right vertical frame 21c, the first left vertical frame 21d, the first lateral frame 21b, and the lateral frame 21e may be partially or entirely connected to other frame with a bolt. Also, at least one of the first frame 21 or the second frame 22 may have a surface throughout its outer shape, instead of having a hollow skeleton shape. Further, the shapes of the first frame 21 and the second frame 22 are not limited to the shapes described in the above-described preferred embodiments, insofar as the frames have necessary strengths and functions.

In the above-described preferred embodiments, the first frame 21 and the second frame 22 are connected to each other by welding. The first frame 21 and the connector 26 may be connected to each other with a bolt. In this case, the frame body according to another preferred embodiment may be configured such that the first frame 21 and the connector 26 are disconnectable from each other. Further, the frame body according to another preferred embodiment may be configured such that by disconnecting the first frame 21 and the connector 26 from each other, the connector 26 and the second frame 22 are removable from the first frame 21.

Figure 11:
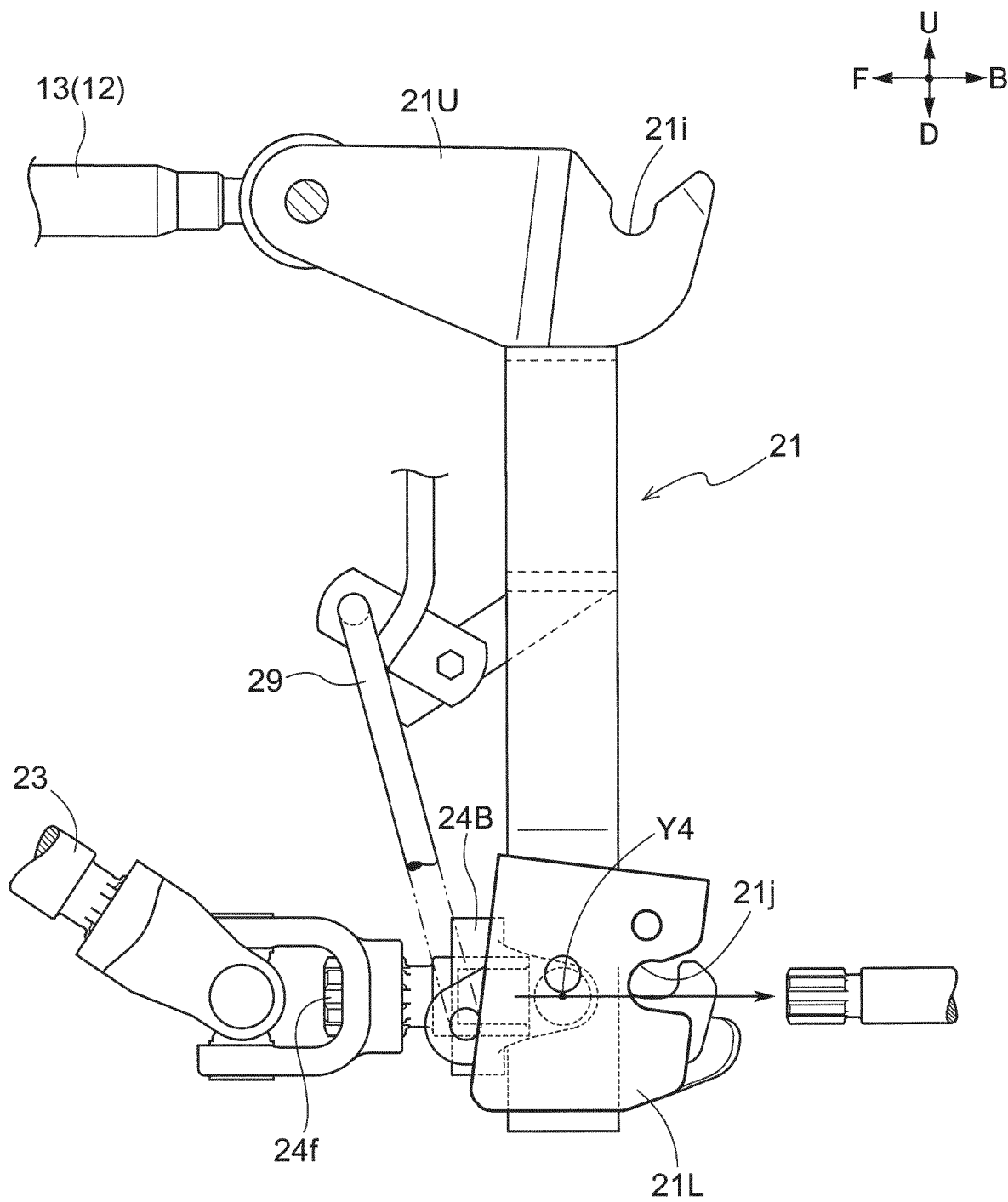
FIG. 11 is an enlarged left side view of an auto-hitch mechanism according to another preferred embodiment of the present invention.

As illustrated in FIG. 11, the first frame 21 may be connected to both the three-point link mechanism 12 and the work apparatus. In the preferred embodiment illustrated in FIG. 11, a locking depression section 21i is located at the first apex portion 21U, and a locking depression section 21j is located at each of the first bottom corner portions 21L and 21R. The locking depression section 21i is the same or substantially the same in configuration as the locking depression section 22i. The locking depression section 21j is the same or substantially the same in configuration as the locking depression section 22j. Also as illustrated in FIG. 11, a case 24B, which is the same or substantially the same in configuration as the case 24F, is swingably supported by the first right vertical frame 21c and the first left vertical frame 21d. In the preferred embodiment illustrated in FIG. 11, the case 24B is swingable about an axis Y4. The axis Y4 extends in the lateral direction of the machine body 3. A power extraction shaft 24f is connected to the rear end portion of the universal joint 23. The power extraction shaft 24f is swingable integrally with the case 24B about the axis Y4, which extends in the lateral direction of the machine body 3. The power extraction shaft 24f and the power input shaft of the work apparatus may be connected to each other by a spline structure.

In the preferred embodiment illustrated in FIG. 11, the first apex portion 21U and the left and right first bottom corner portions 21L and 21R are non-limiting examples of the "third connector" according to a preferred embodiment of the present invention. That is, in the preferred embodiment illustrated in FIG. 11, the first frame 21 includes a third connector that is substantially identical to the second connector (the second apex portion 22U and the second bottom corner portions 22L and 22R). It is possible that the work apparatus is connectable to the third connector with the connector 26 and the second frame 22 being removed from the first frame 21. It is to be noted that in a case where the connector 26 and the second frame 22 are connected to the first frame 21, the power extraction shaft 24f may be connected to the input shaft 24c by, for example, a spline structure.

In the above-described preferred embodiments, the case 24F has, at its lower portion, an opening through which the power extraction shaft 25c passes. This opening may be large enough for the case 25A to pass through, and the case 25A may be inserted in the case 24F. It is also possible that a rubber cover is provided around the case 25A to cover the gap between the case 25A and the opening.

In the above-described preferred embodiments, the power extraction section 25 is disposed at the rear side of the rear end of each lower link 14 located at its lowest position. This preferred embodiment, however, is not intended in a limiting sense. For example, the power extraction section 25 may be disposed at the same or substantially the same position as, in the front-rear direction, the rear end portion of each lower link 14 located at its lowest position. In this configuration, the work apparatus as a whole is positioned closer to the link mechanism. As a result, the moment load involved with the upward movement of the work apparatus is reduced.

In the above-described preferred embodiments, the connector 26 includes the apex frame section 26U, the left bottom corner frame section 26L, and the right bottom corner frame section 26R. This preferred embodiment, however, is not intended in a limiting sense. Another possible preferred embodiment is that the connector 26 has a subsidiary frame other than the apex frame section 26U, the left bottom corner frame section 26L, and the right bottom corner frame section 26R. That is, the connector 26 may connect the first frame 21 and the second frame 22 in any manner and may have any shape.

The power extraction section 25 may be surrounded by a portion of the frame body (at least one of the first frame 21 or the second frame 22) or may be surrounded by the entire frame body.

The frame body (at least one of the first frame 21 or the second frame 22) may surround a portion of the power transfer apparatus (the universal joint 23 and the vertical transmission mechanism 24) or may surround the entire power transfer apparatus.

In the above-described preferred embodiments, the first frame 21 has an isosceles-triangular shape, and the second frame has an isosceles-triangular shape that is the same or substantially the same as the isosceles-triangular shape of the first frame 21. This preferred embodiment, however, is not intended in a limiting sense. Another possible preferred embodiment is that the first frame 21 and the second frame 22 have triangular shapes different from each other in at least one of size or shape. Another possible preferred embodiment is that at least one of the first frame 21 or the second frame 22 has such a shape as an equilateral triangle, a quadrangle, and a pentagon. Another possible preferred embodiment is that the first frame 21 and the second frame 22 have substantially the same triangular shapes, the same substantially triangular shapes, or substantially the same substantially triangular shapes. That is, each of the first frame 21 and the second frame 22 may have any shape insofar as there is a good balance of power transmission between the left and right sides of each frame.

In the above-described preferred embodiments, the vertical transmission mechanism 24 is supported by the first frame 21, and the power extraction section 25 is swingable about the axis Y3. This preferred embodiment, however, is not intended in a limiting sense. Another possible preferred embodiment is that instead of the vertical transmission mechanism 24 being supported by the first frame 21, the vertical transmission mechanism 24 and the power extraction section 25 are integrally swingable about the axis Y3.

In the above-described preferred embodiments, the vertical transmission mechanism 24 includes the endless rotational-movement chain 24e so that the endless rotational-movement chain 24e transfers the power from the universal joint 23 to the power extraction section 25. This preferred embodiment, however, is not intended in a limiting sense. Another possible preferred embodiment is that the vertical transmission mechanism 24 includes a transfer shaft extending in the up-down direction. In this possible preferred embodiment, a bevel gear may be provided between the input shaft 24c and the transfer shaft, and another bevel gear may be provided between the transfer shaft and the power extraction shaft 25c. With the bevel gears thus provided, the rotational power of the input shaft 24c may be transferred to the power extraction shaft 25c via the transfer shaft and the bevel gears.

In the above-described preferred embodiments, the vertical transmission mechanism 24 is detachable. The vertical transmission mechanism 24, however, may be undetachable from the frame body.

In the above-described preferred embodiments, a general-purpose work apparatus, which is not high-clearance compatible, is attached to a tractor having a high clearance configuration via the auto-hitch mechanism 20. This preferred embodiment, however, is not intended in a limiting sense. For example, in a medium-size tractor or a large-size tractor, the link mechanism is disposed at a position higher than the position of the link mechanism in a small-size tractor. In view of this fact, the auto-hitch mechanism 20 according to the above-described preferred embodiments may be used when a work apparatus for a small-size tractor is attached to a medium-size tractor or a large-size tractor. Also, in a case where a work apparatus for a medium-size tractor or a work apparatus for a large-size tractor is attached to a small-size tractor, it is possible to use such an auto-hitch mechanism 20 that the second connector is disposed at a position higher than the first connector.

The transmission apparatus according to the above-described preferred embodiments may be a hydrostatic continuously variable transmission or may be a continuously variable transmission.

In the above-described preferred embodiments, the second connector of the second frame 22 is disposed at a position lower than the first connector of the first frame 21. This preferred embodiment, however, is not intended in a limiting sense. Another possible preferred embodiment is that the second connector of the second frame 22 is disposed at a position higher than the first connector of the first frame 21. For example, in a case where a work apparatus having a high clearance configuration is mounted on a general-purpose tractor, which is not high-clearance compatible, it is possible to use such an auto-hitch mechanism 20 that the second connector is disposed at a position higher than the first connector.

In the above-described preferred embodiments, the second bottom corner portions 22L and 22R and the power extraction section 25 are disposed at positions lower than the lowest positions of the lower links 14. This preferred embodiment, however, is not intended in a limiting sense. Another possible preferred embodiment is that one of the second bottom corner portions 22L and 22R and the power extraction section 25 is disposed at a position lower than the lowest positions of the lower links 14.

A locking mechanism 27 may be provided as a locking mechanism for the locking depression section 22i in addition to the locking mechanism 27 for the locking depression section 22j. Alternatively, a locking mechanism 27 may be provided as a locking mechanism for the locking depression section 22i instead of the locking mechanism 27 for the locking depression section 22j.

The first frame 21 may surround the rear end portion of the universal joint 23 and a portion of the vertical transmission mechanism 24, or may surround the rear end portion of the universal joint 23 and the entire vertical transmission mechanism 24. Also, the second frame 22 may surround a portion of the power extraction section 25 or may surround the entire power extraction section 25.

The preferred embodiments of the present invention will find applications in, but not limited to, tractors equipped with link mechanisms capable of connecting work apparatus to the tractors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A tractor connectable to and disconnectable from a work apparatus, the tractor comprising:
   a link mechanism including a top link, a right lower link, and a left lower link, the link mechanism being connectable to and disconnectable from the work apparatus and being configured to move the work apparatus upward and downward when the work apparatus is connected thereto; and
   a power extractor that includes a power extraction shaft to engage with and disengage from a power input of the work apparatus to take power from a power source and supply the power to the work apparatus when the power extraction shaft and the power input are engaged with each other; wherein
   the power extractor is located at a position lower than a lowest position of the right lower link and a lowest position of the left lower link.

2. The tractor according to claim 1, wherein the power extractor is located at a rear side of a rear end of the right lower link located at its lowest position and a rear end of the left lower link located at its lowest position.

3. The tractor according to claim 1, further comprising a frame body connected to the top link, the left lower link, and the right lower link; wherein
   the frame body is connectable to the work apparatus; and
   the power extractor is supported and surrounded by the frame body.

4. The tractor according to claim 3, further comprising:
   a transmission apparatus to change a speed of the power from the power source, the transmission apparatus including a work power output shaft located at a position higher than the lowest position of the right lower link and the lowest position of the left lower link to output the power at the changed speed; and a power transfer apparatus connecting the work power output shaft and the power extractor to each other such that the power is transferable between the work power output shaft and the power extractor; wherein the frame body surrounds the power transfer apparatus.

5. A tractor comprising:

a link mechanism including a top link, a right lower link, and a left lower link, the link mechanism being connectable to a work apparatus to move the work apparatus upward and downward;

a power extractor that is connectable to a power input of the work apparatus to take power from a power source and supply the power to the work apparatus;

a frame body connected to the top link, the left lower link, and the right lower link;

a transmission apparatus to change a speed of the power from the power source, the transmission apparatus including a work power output shaft located at a position higher than a lowest position of the right lower link and a lowest position of the left lower link to output the power at the changed speed; and a power transfer apparatus connecting the work power output shaft and the power extractor to each other such that the power is transferable between the work power output shaft and the power extractor; wherein the power extractor is located at a position lower than the lowest position of the right lower link and the lowest position of the left lower link;

the frame body is connectable to the work apparatus;

the power extractor is supported and surrounded by the frame body;

the frame body surrounds the power transfer apparatus; and the power transfer apparatus is an attachable and detachable power transfer apparatus.

6. A tractor comprising:

a link mechanism including a top link, a right lower link, and a left lower link, the link mechanism being connectable to a work apparatus to move the work apparatus upward and downward;

a power extractor that is connectable to a power input of the work apparatus to take power from a power source and supply the power to the work apparatus; and a frame body connected to the top link, the left lower link, and the right lower link; wherein the power extractor is located at a position lower than a lowest position of the right lower link and a lowest position of the left lower link;

the frame body is connectable to the work apparatus;

the power extractor is supported and surrounded by the frame body;

the frame body is connectable to the work apparatus based on an upward movement of the link mechanism and is disconnectable from the work apparatus based on a downward movement of the link mechanism; and the power extractor is supported by the frame body such that the power extractor is swingable about an axis extending in a left-right direction of the tractor.

7. The tractor according to claim 6, further comprising:

a sprocket located at the power extractor to input the power into the power extractor; and a power transfer apparatus to transfer the power to the power extractor; wherein the power transfer apparatus includes a chain wound around the sprocket.

8. A tractor comprising:

a link mechanism including a top link, a right lower link, and a left lower link, the link mechanism being connectable to a work apparatus to move the work apparatus upward and downward;

a power extractor that is connectable to a power input of the work apparatus to take power from a power source and supply the power to the work apparatus; and a frame body connected to the top link, the left lower link, and the right lower link; wherein the power extractor is located at a position lower than a lowest position of the right lower link and a lowest position of the left lower link;

the frame body is connectable to the work apparatus;

the power extractor is supported and surrounded by the frame body; and the frame body is attachable to and detachable from the link mechanism.

9. A tractor comprising:

a link mechanism including a top link, a right lower link, and a left lower link, the link mechanism being connectable to a work apparatus to move the work apparatus upward and downward; and a power extractor that is connectable to a power input of the work apparatus to take power from a power source and supply the power to the work apparatus; wherein a transmission apparatus to change a speed of the power from the power source, the transmission apparatus including a work power output shaft located at a position higher than a lowest position of the right lower link and a lowest position of the left lower link to output the power at the changed speed; and a power transfer apparatus connecting the work power output shaft and the power extractor to each other such that the power is transferable between the work power output shaft and the power extractor; wherein the power extractor is located at a position lower than the lowest position of the right lower link and the lowest position of the left lower link;

the power transfer apparatus includes:

a lateral shaft connected to the work power output shaft and extending through a position higher than the position of the power extractor to a rear end portion of the right lower link and a rear end portion of the left lower link; and a vertical connector connecting a rear end portion of the lateral shaft and the power extractor to each other to transfer the power along a vertical direction of the tractor.

10. The tractor according to claim 9, wherein the power transfer apparatus is an attachable and detachable power transfer apparatus.

11. The tractor according to claim 9, wherein the vertical connector includes:

an input to which the lateral shaft is connected; and a vertical transfer connector to extend in an up-down direction of the tractor when the link mechanism is located at a lowest position so as to connect the input and the power extractor to each other; and the input of the vertical connector overlaps with the power extractor in a front-rear direction of the tractor.

12. The tractor according to claim 11, wherein the vertical connector includes a case in which the vertical transfer connector is contained.

13. A tractor comprising:

a link mechanism including a top link, a right lower link, and a left lower link, the link mechanism being connectable to a work apparatus to move the work apparatus upward and downward;
a power extractor that is connectable to a power input of the work apparatus to take power from a power source and supply the power to the work apparatus;
a travel device including a left front wheel, a right front wheel, a left rear wheel, and a right rear wheel;
a transmission apparatus to change the power from the power source; and
a rear transfer case to transfer the power output from the transmission apparatus to the left rear wheel and the right rear wheel; wherein
the power extractor is located at a position lower than a lowest position of the right lower link and a lowest position of the left lower link; and
the rear transfer case includes:
an upper connector connected to a rear travel output of the transmission apparatus to output the power to the left rear wheel and the right rear wheel; and
a lower connector connected to the left rear wheel and the right rear wheel, the upper connector being located at a position higher than a position of the lower connector.

14. A tractor comprising:
a link mechanism including a top link, a right lower link, and a left lower link to move a work apparatus upward and downward; and
a frame body between the link mechanism and the work apparatus and connecting the link mechanism and the work apparatus to each other; wherein
the frame body includes:
a first frame connected to the top link, the left lower link, and the right lower link;
a second frame behind the first frame and connected to the work apparatus; and
a connector connecting the first frame and the second frame to each other;
the first frame includes a first connector to which the top link, the left lower link, and the right lower link are connected; and
the second frame includes a second connector to which the work apparatus is connected; and
when the link mechanism is at a lowest position, the first connector is at a position different from a position of the second connector.

15. The tractor according to claim 14, wherein when the link mechanism is at the lowest position, the position of the second connector is lower than the position of the first connector.

16. The tractor according to claim 15, wherein the second connector includes a portion located at a position that is lowest of the second connector and that is lower than a lowest position of the right lower link and a lowest position of the left lower link.

17. The tractor according to claim 14, wherein
the first connector includes:
a first apex portion to which a free end portion of the top link is connected:
a left first bottom corner portion to which the left lower link is connected: and
a right first bottom corner portion to which the right lower link is connected;
the first frame has a triangular shape defined by the first apex portion, the left first bottom corner portion, and the right first bottom corner portion;
the second connector includes:
a second apex portion to which a first connection tool of the work apparatus is connected;
a left second bottom corner portion to which a second connection tool of the work apparatus is connected; and
a right second bottom corner portion to which a third connection tool of the work apparatus is connected;
the second frame has a triangular shape defined by the second apex portion, the left second bottom corner portion, and the right second bottom corner portion; and
the connector includes:
an apex frame extending between the first apex portion and the second apex portion;
a left bottom corner frame extending between the left first bottom corner portion and the left second bottom corner portion; and
a right bottom corner frame extending between the right first bottom corner portion and the right second bottom corner portion.

18. The tractor according to claim 17, wherein the triangular shape of the first frame is the same or substantially the same as the triangular shape of the second frame.

19. The tractor according to claim 14, wherein
the second connector includes:
a lockable body lockable to a connection tool of the work apparatus; and
a locking mechanism to keep the lockable body in a locked state;
while the locking mechanism is keeping the locked state of the lockable body, the second connector and the work apparatus are kept in a connected state in which the second connector and the work apparatus are connected to each other;
upon the locking mechanism releasing the locked state of the lockable body, the connected state between the second connector and the work apparatus is released; and
the tractor further includes an operation tool located at a position at which the operation tool is manually operable from a driver to switch the locking mechanism between keeping the locked state of the lockable body and releasing the locked state of the lockable body.

20. The tractor according to claim 14, wherein
the frame body is operable to:
disconnect the first frame and the connector from each other; and
disconnect the first frame and the connector from each other to remove the connector and the second frame from the first frame;
the first frame includes a third connector that is the same or substantially the same as the second connector; and
the work apparatus is connectable to the third connector with the connector and the second frame being removed from the first frame.

21. The tractor according to claim 14, further comprising:
a transmission apparatus to change a speed of power from a power source and including a work power output shaft to output the power at the changed speed;
a power extractor that is connectable to a power input of the work apparatus to take the power from the power source and supply the power to the work apparatus; and
a power transfer apparatus connecting the work power output shaft and the power extractor to each other such that the power is transferable between the work power output shaft and the power extractor; wherein the work power output shaft and the power extractor have a height relationship such that the work power output shaft and the power extractor are located at different heights, the height relationship being the same or substantially the same as a height relationship a height relationship between the first connector and the second connector; and the work power output shaft is surrounded by the first frame, and the power extractor is surrounded by the second frame.

22. The tractor according to claim 14, wherein the frame body is connectable to the work apparatus based on an upward movement of the link mechanism and is disconnectable from the work apparatus based on a downward movement of the link mechanism.

23. The tractor according to claim 14, further comprising:
a travel device including a left front wheel, a right front wheel, a left rear wheel, and a right rear wheel;
a transmission apparatus to change power from a power source; and
a rear transfer case to transfer the power output from the transmission apparatus to the left rear wheel and the right rear wheel; wherein
the rear transfer case includes:
an upper connector connected to a rear travel output of the transmission apparatus to output the power to the left rear wheel and the right rear wheel; and
a lower connector connected to the left rear wheel and the right rear wheel, the upper connector being located at a position higher than a position of the lower connector.

* * * * *

UNITED STATES PATENT AND TRADEMARK OFFICE
CERTIFICATE OF CORRECTION

| | |
|---|---|
| PATENT NO. | : 12,010,936 B2 |
| APPLICATION NO. | : 17/825072 |
| DATED | : June 18, 2024 |
| INVENTOR(S) | : Kumiko Kobayashi et al. |

It is certified that error appears in the above-identified patent and that said Letters Patent is hereby corrected as shown below:

On the Title Page

Item (73), for the Assignee, change "KUBOTA CORPORATION, Kyoto (JP)" to --KUBOTA CORPORATION, Osaka (JP)--

Signed and Sealed this
Twelfth Day of August, 2025

Coke Morgan Stewart
*Acting Director of the United States Patent and Trademark Office*